US010615931B2

(12) United States Patent
Seo

(10) Patent No.: US 10,615,931 B2
(45) Date of Patent: Apr. 7, 2020

(54) METHOD FOR MEASURING A WIRELESS COMMUNICATION STATE IN A WIRELESS ACCESS SYSTEM, AND APPARATUS THEREFOR

(71) Applicant: LG ELECTRONICS INC., Seoul (KR)

(72) Inventor: Hanbyul Seo, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 148 days.

(21) Appl. No.: 14/362,067

(22) PCT Filed: Dec. 21, 2012

(86) PCT No.: PCT/KR2012/011254
§ 371 (c)(1),
(2) Date: May 30, 2014

(87) PCT Pub. No.: WO2013/095034
PCT Pub. Date: Jun. 27, 2013

(65) Prior Publication Data
US 2014/0293953 A1 Oct. 2, 2014

Related U.S. Application Data

(60) Provisional application No. 61/579,635, filed on Dec. 22, 2011.

(51) Int. Cl.
*H04L 5/00* (2006.01)
*H04W 24/10* (2009.01)
*H04J 11/00* (2006.01)

(52) U.S. Cl.
CPC .......... *H04L 5/0048* (2013.01); *H04L 5/0073* (2013.01); *H04W 24/10* (2013.01); *H04J 11/005* (2013.01); *H04L 5/0007* (2013.01)

(58) Field of Classification Search
None
See application file for complete search history.

(56) References Cited

U.S. PATENT DOCUMENTS 6,982,959 B1    1/2006  Salonaho et al.
2004/0174845 A1  9/2004  Koo et al.
(Continued)

FOREIGN PATENT DOCUMENTS

CN    1720759 A     1/2006
CN    101981953 A   2/2011
(Continued)

OTHER PUBLICATIONS

3GPP, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description . . . ," 3GPP TS 36.300 V10.5.0, Sep. 2011, pp. 1-194.
(Continued)

*Primary Examiner* — Jeffrey M Rutkowski
*Assistant Examiner* — Mehedi S Aley
(74) *Attorney, Agent, or Firm* — Birch, Stewart, Kolasch & Birch, LLP

(57) ABSTRACT

A method is presented for supporting a downlink (DL) transmission measurement of a user equipment (UE) in a wireless access system for supporting an environment in which amounts of uplink (UL) and DL resources are dynamically changed. A base station transmits information about a candidate group of UL subframes to the UE, transmits information about a resource to be measured which is used for DL transmission among the candidate group of UL subframes to the UE, transmits a reference signal configured for the DL transmission measurement in the resource to the UE, and receives a result of the DL
(Continued)

transmission measurement using the reference signal in the resource, from the UE. The resource is the same resource which is used for DL transmission in an adjacent base station.

4 Claims, 9 Drawing Sheets

(56) References Cited

U.S. PATENT DOCUMENTS

| | | | |
|---|---|---|---|
| 2008/0227448 A1 | 9/2008 | Kim et al. | |
| 2009/0046605 A1* | 2/2009 | Gao | H04W 72/14 370/280 |
| 2009/0268678 A1* | 10/2009 | Huo | H04W 52/52 370/329 |
| 2011/0034175 A1* | 2/2011 | Fong | H04B 7/024 455/450 |
| 2011/0085478 A1* | 4/2011 | Zhongfeng | H04B 7/155 370/280 |
| 2011/0116455 A1* | 5/2011 | Damnjanovic | H04L 1/0028 370/329 |
| 2012/0115463 A1* | 5/2012 | Weng | H04L 1/0026 455/425 |
| 2012/0230217 A1* | 9/2012 | Sawai | H04L 5/001 370/252 |
| 2012/0307922 A1* | 12/2012 | Simonsson | H04W 24/10 375/260 |
| 2013/0083736 A1* | 4/2013 | Yin | H04W 72/0446 370/329 |
| 2013/0252620 A1* | 9/2013 | Kobayashi | H04W 52/325 455/446 |
| 2013/0272173 A1* | 10/2013 | Niu | H04W 52/04 370/280 |
| 2013/0336177 A1* | 12/2013 | Gao | H04W 72/0446 370/280 |
| 2013/0343241 A1* | 12/2013 | Niu | H04B 15/00 370/280 |
| 2014/0161003 A1* | 6/2014 | Han | H04W 52/146 370/280 |
| 2014/0329516 A1* | 11/2014 | Falconetti | H04W 28/0215 455/418 |

FOREIGN PATENT DOCUMENTS

| | | |
|---|---|---|
| KR | 10-2006-0067403 A | 6/2006 |
| KR | 10-0689566 B1 | 3/2007 |
| KR | 10-2007-0054805 A | 5/2007 |
| KR | 10-2008-0083939 A | 9/2008 |
| WO | WO 2011/061903 A1 | 5/2011 |

OTHER PUBLICATIONS

Sharp, "Fast uplink-downlink re-configuration with traffic adaptation by PHY layer signaling," 3GPP TSG-RAN WG1 #66, Aug. 22-26, 2011, pp. 1-2, R1-112487.

* cited by examiner (a)

(b)

METHOD FOR MEASURING A WIRELESS COMMUNICATION STATE IN A WIRELESS ACCESS SYSTEM, AND APPARATUS THEREFOR

CROSS REFERENCE TO RELATED APPLICATIONS:

This application is the National Phase of PCT/KR2012/011254 filed on Dec. 21, 2012, which claims priority under 35 U.S.C. 119(e) to U.S. Provisional Application No. 61/579,635 filed on Dec. 22, 2011, all of which are hereby expressly incorporated by reference into the present application.

TECHNICAL FIELD

The present invention relates to a wireless access system, and more particularly, a method for measuring a wireless communication state in a wireless access system for supporting an environment in which amounts of uplink (UL) and downlink (DL) resources are dynamically changed, and an apparatus for supporting the method.

BACKGROUND ART

Mobile communication systems have been developed in order to provide voice services while ensuring the activity of users. However, a mobile communication system have gradually extended its field to data services as well as voice services and have been currently developed so as to provide high speed data services. However, in a mobile communication system that currently provides services, resources are insufficient and users require higher speed services, and thus, there has been a need for a more developed mobile communication system.

One of most important factors among requirements of a next-generation wireless access system is to support high data transfer rate requirement. To this end, researches have been conducted into various technologies such as multiple input multiple output (MIMO), cooperative multiple point transmission (CoMP), relay, etc.

A conventional wireless access system, because uplink (UL) resources and downlink (DL) resources are fixedly configured, even if UL and DL traffic are changed, traffic is processed within limited resources. However, in consideration of an environment in which an eNB dynamically changes the amounts of UL and DL resources according to the amount of UL and DL traffic, even UL resource can be used as DL resource, and even DL resource can be used as UL resource. In this situation, even if resource is configured for UL or DL, a UE needs to perform an appropriate operation according to use of the corresponding resource.

DISCLOSURE

Technical Problem

An object of the present invention devised to solve the problem lies in a method and apparatus for smoothly measuring a wireless communication state by a UE in a wireless access system, preferably, in a wireless access system for supporting an environment in which amounts of uplink (UL) and downlink (DL) resources are dynamically changed.

Another object of the present invention devised to solve the problem lies in a method and apparatus for measuring a wireless communication state in UL resource and/or DL resource by a UE in a wireless access system, preferably, in a wireless access system for supporting an environment in which amounts of UL and DL resources are dynamically changed.

Another object of the present invention devised to solve the problem lies in a method and apparatus effectively determining resource (UL resource or DL resource) in which a UE is supposed to communicate in a wireless access system, preferably, in a wireless access system for supporting an environment in which amounts of UL and DL resources are dynamically changed.

It is to be understood that both the foregoing general description and the following detailed description of the present invention are exemplary and explanatory and are intended to provide further explanation of the invention as claimed.

Technical Solution

The object of the present invention can be achieved by providing a method for supporting measurement of a user equipment (UE) in a wireless access system for supporting an environment in which amounts of uplink (UL) and downlink (DL) resources are dynamically changed, the method including transmitting information about measurement resource to the UE, transmitting a reference signal to the UE, and receiving a result of the measurement using the reference signal in the measurement resource, from the UE, wherein the measurement resource is determined in consideration of whether the same resource is used for DL or UL in an adjacent eNB.

In another aspect of the present invention, provided herein is an eNB for supporting measurement of a user equipment (UE) in a wireless access system for supporting an environment in which amounts of uplink (UL) and downlink (DL) resources are dynamically changed, the eNB including a radio frequency (RF) unit for transmitting and receiving a radio signal, and a processor for information about measurement resource to the UE, transmitting a reference signal to the UE, and receiving a result of the measurement using the reference signal in the measurement resource, from the UE, wherein the measurement resource is determined in consideration of whether the same resource is used for DL or UL in an adjacent eNB.

The measurement resource may be configured only in a subframe used for DL transmission by the adjacent eNB.

The method may further include transmitting indication information indicating that the measurement resource is valid when the measurement resource is configured as UL resource.

The measurement resource may be divided into first measurement resource and second measurement resource, the first measurement resource may be configured only in a subframe used for DL transmission by the adjacent eNB, and the second measurement resource may be configured only in a subframe used for UL transmission by the adjacent eNB.

The measurement may include at least one of reference signal received power (RSRP) measurement, reference signal received quality (RSRQ) measurement, received signal strength indicator (RSSI) measurement, and radio link monitoring (RLM) measurement.

The RSRP may be measured only in DL resource, and the RSSI may be measured only in UL resource used for DL transmission.

In a case of the RSSI measurement, a result of the measurement may include distribution information of measured RSSI values measured over a plurality of predetermined subframes.

The distribution information may include at least one of maximum and minimum of RSSI values measured over a plurality of predetermined subframes, a frequency at which RSSI that is equal to or more than a predetermined threshold or is equal to or less than the predetermined threshold is measured over the plural predetermined subframes, information of a subframe in which the RSSI that is equal to or more than a predetermined threshold or is equal to or less than the predetermined threshold is measured over the plural predetermined subframes, an average value of measured RSSI values that are equal to or more than a predetermined threshold or equal to or less than the predetermined threshold over the plural predetermined subframes, an measured RSSI value corresponding to predetermined top or low percentage among measured RSSI values measured over the plural predetermined subframes, and an average value of measured RSSI values corresponding to predetermined top or low percentage among measured RSSI values measured over the plural predetermined subframes.

In another aspect of the present invention, provided herein is a method of performing measurement in a wireless access system for supporting an environment in which amounts of uplink (UL) and downlink (DL) resources are dynamically changed, the method including receiving information about measurement resource from an eNB, receiving a reference signal from the eNB, performing measurement using the reference signal in the measurement resource, and transmitting a result of the measurement to the eNB, wherein the measurement resource is determined in consideration of whether the same resource is used for DL or UL in an adjacent eNB.

In another aspect of the present invention, provided herein is a user equipment (UE) for performing measurement in a wireless access system for supporting an environment in which amounts of uplink (UL) and downlink (DL) resources are dynamically changed, the UE including a radio frequency (RF) unit for transmitting and receiving a radio signal, and a processor for information about measurement resource from an eNB, receiving a reference signal from the eNB, performing measurement using the reference signal in the measurement resource, and transmitting a result of the measurement to the eNB, wherein the measurement resource is determined in consideration of whether the same resource is used for DL or UL in an adjacent eNB.

The method may further include transmitting indication information indicating that the measurement resource is valid when the measurement resource is configured as UL resource.

The measurement resource may be divided into first measurement resource and second measurement resource, the first measurement resource is configured only in a subframe used for DL transmission by the adjacent eNB, and the second measurement resource is configured only in a subframe used for UL transmission by the adjacent eNB.

The measurement may include at least one of reference signal received power (RSRP) measurement, reference signal received quality (RSRQ) measurement, received signal strength indicator (RSSI) measurement, and radio link monitoring (RLM) measurement.

The RSRP may be measured only in DL resource, and the RSSI may be measured only in UL resource used for DL transmission.

In a case of the RSSI measurement, a result of the measurement may include distribution information of measured RSSI values measured over a plurality of predetermined subframes.

The distribution information may include at least one of maximum and minimum of RSSI values measured over a plurality of predetermined subframes, a frequency at which RSSI that is equal to or more than a predetermined threshold or is equal to or less than the predetermined threshold is measured over the plural predetermined subframes, information of a subframe in which the RSSI that is equal to or more than a predetermined threshold or is equal to or less than the predetermined threshold is measured over the plural predetermined subframes, an average value of measured RSSI values that are equal to or more than a predetermined threshold or equal to or less than the predetermined threshold over the plural predetermined subframes, an measured RSSI value corresponding to predetermined top or low percentage among measured RSSI values measured over the plural predetermined subframes, and an average value of measured RSSI values corresponding to predetermined top or low percentage among measured RSSI values measured over the plural predetermined subframes.

Advantageous Effects

According to embodiments of the present invention, a wireless communication state can be smoothly measured in a wireless access system, preferably, in a wireless access system for supporting an environment in which amounts of uplink (UL) and downlink (DL) resources are dynamically changed.

According to the embodiments of the present invention, measurement can be more accurately and stably performed by performing measurement in UL resource and/or DL resource in consideration of a transmission direction of an adjacent cell in a wireless access system, preferably, in a wireless access system for supporting an environment in which amounts of UL and DL resources are dynamically changed.

According to the embodiments of the present invention, a corresponding user equipment (UE) can be most appropriately scheduled in resource in which a combination of a communication direction of a serving cell and a communication direction of an adjacent cell is used according to a situation of each UE in a wireless access system, preferably, in a wireless access system for supporting an environment in which amounts of UL and DL resources are dynamically changed.

It will be appreciated by persons skilled in the art that that the effects that could be achieved with the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention, illustrate embodiments of the invention and together with the description serve to explain the principle of the invention.

In the drawings.

BEST MODE

Figure 1:
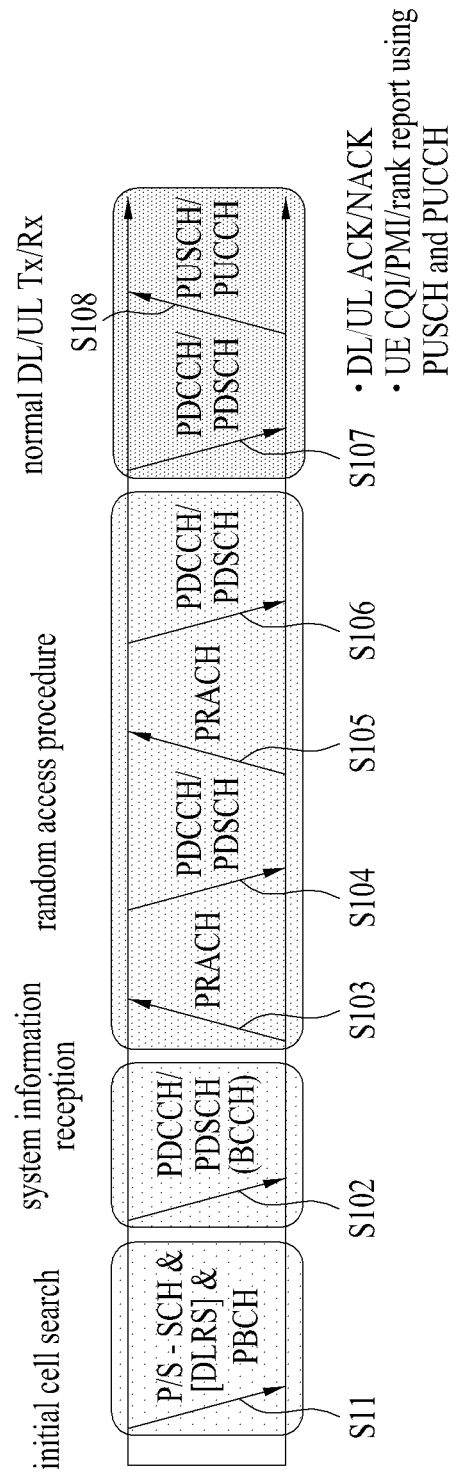
FIG. 1 illustrates physical channels and a general method for transmitting signals on physical channels in a 3rd generation partnership project long term evolution (3GPP LTE) system.

Reference will now be made in detail to the exemplary embodiments of the present invention with reference to the accompanying drawings. The detailed description, which will be given below with reference to the accompanying drawings, is intended to explain exemplary embodiments of the present invention, rather than to show the only embodiments that may be implemented according to the invention. The following detailed description includes specific details in order to provide a thorough understanding of the present invention. However, it will be apparent to those skilled in the art that the present invention may be practiced without such specific details.

In some instances, well-known structures and devices are omitted in order to avoid obscuring the concepts of the present invention and important functions of the structures and devices are shown in block diagram form.

The embodiments of the present invention are disclosed on the basis of a data communication relationship between a base station and a terminal. In this case, the base station is used as a terminal node of a network via which the base station can directly communicate with the terminal. Specific operations to be conducted by the base station in the present invention may also be conducted by an upper node of the base station as necessary. In other words, it will be obvious to those skilled in the art that various operations for enabling the base station to communicate with the terminal in a network composed of several network nodes including the base station will be conducted by the base station or other network nodes other than the base station. The term "base station (BS)" may be replaced with a fixed station, Node-B, eNode-B (eNB), or an access point (AP) as necessary. The term "relay" may be replaced with the terms relay node (RN) or relay station (RS). The term "terminal" may also be replaced with a user equipment (UE), a mobile station (MS), a mobile subscriber station (MSS), a subscriber station (SS), an advanced mobile station (AMS), a wireless terminal (WT), a machine-type communication (MTC) device, a machine-to-machine (M2M) device, or a device-to-device (D2D) device as necessary.

It should be noted that specific terms disclosed in the present invention are proposed for convenience of description and better understanding of the present invention, and the use of these specific terms may be changed to other formats within the technical scope or spirit of the present invention.

Exemplary embodiments of the present invention are supported by standard documents disclosed for at least one of wireless access systems including an institute of electrical and electronics engineers (IEEE) 802 system, a $3^{rd}$ generation partnership project (3GPP) system, a 3GPP long term evolution (LTE) system, an LTE-advanced (LTE-A) system, and a 3GPP2 system. In particular, steps or parts, which are not described to clearly reveal the technical idea of the present invention, in the embodiments of the present invention may be supported by the above documents. All terminology used herein may be supported by at least one of the above-mentioned documents.

The following embodiments of the present invention can be applied to a variety of wireless access technologies, for example, code division multiple access (CDMA), frequency division multiple access (FDMA), time division multiple access (TDMA), orthogonal frequency division multiple access (OFDMA), single carrier frequency division multiple access (SC-FDMA), and the like. CDMA may be embodied through wireless (or radio) technology such as universal terrestrial radio access (utra) or CDMA2000. TDMA may be embodied through wireless (or radio) technology such as global system for mobile communication (GSM)/general packet radio service (GPRS)/enhanced data rates for GSM evolution (EDGE). OFDMA may be embodied through wireless (or radio) technology such as institute of electrical and electronics engineers (IEEE) 802.11 (Wi-Fi), IEEE 802.16 (WiMAX), IEEE 802-20, and evolved UTRA (E-UTRA). UTRA is a part of universal mobile telecommunications system (UMTS). 3rd generation partnership project (3GPP) long term evolution (LTE) is a part of E-UMTS (Evolved UMTS), which uses E-UTRA. 3GPP LTE employs OFDMA in downlink and employs SC-FDMA in uplink. LTE-Advanced (LTE-A) is an evolved version of 3GPP LTE.

For clarity, the following description focuses on IEEE 802.11 systems. However, technical features of the present invention are not limited thereto.

1. 3GPP LTE/LTE-a System to which the Present Invention is Applicable 1.1. Overview of System FIG. 1 illustrates physical channels and a general method for transmitting signals on the physical channels in the 3GPP LTE system.

When a UE is powered on or enters a new cell, the UE performs initial cell search (S101). The initial cell search involves acquisition of synchronization to an eNB. Specifically, the UE synchronizes its timing to the eNB and acquires information such as a cell identifier (ID) by receiving a primary synchronization channel (P-SCH) and a secondary synchronization channel (S-SCH) from the eNB.

Then the UE may acquire information broadcast in the cell by receiving a physical broadcast channel (PBCH) from the eNB. During the initial cell search, the UE may monitor a DL channel state by receiving a downlink reference signal (DL RS).

After the initial cell search, the UE may acquire more detailed system information by receiving a physical downlink control channel (PDCCH) and receiving a physical downlink shared channel (PDSCH) based on information of the PDCCH (S102).

To complete access to the eNB, the UE may perform a random access procedure with the eNB (S103 to S106). In the random access procedure, the UE may transmit a preamble on a physical random access channel (PRACH) (S103) and may receive a response message to the preamble on a PDCCH and a PDSCH associated with the PDCCH (S104). In the case of a contention-based random access, the UE may additionally perform a contention resolution procedure including transmission of an additional PRACH (S105) and reception of a PDCCH signal and a PDSCH signal corresponding to the PDCCH signal (S 106).

After the above procedure, the UE may receive a PDCCH and/or a PDSCH from the eNB (S107) and transmit a Physical Uplink Shared Channel (PUSCH) and/or a Physical Uplink Control Channel (PUCCH) to the eNB (S108), in a general UL/DL signal transmission procedure.

Control information that the UE transmits to the eNB is called uplink control information (UCI). The UCI includes hybrid automatic repeat and request acknowledgement/negative acknowledgement (HARQ-ACK/NACK), scheduling request (SR), channel quality indication (CQI), precoding matrix index (PMI), a rank indication (RI), etc.

In the LTE system, UCI is generally transmitted on a PUCCH periodically. However, if control information and traffic data should be transmitted simultaneously, they may be transmitted on a PUSCH. In addition, UCI may be transmitted periodically on the PUSCH, upon receipt of a request/command from a network.

Figure 2:
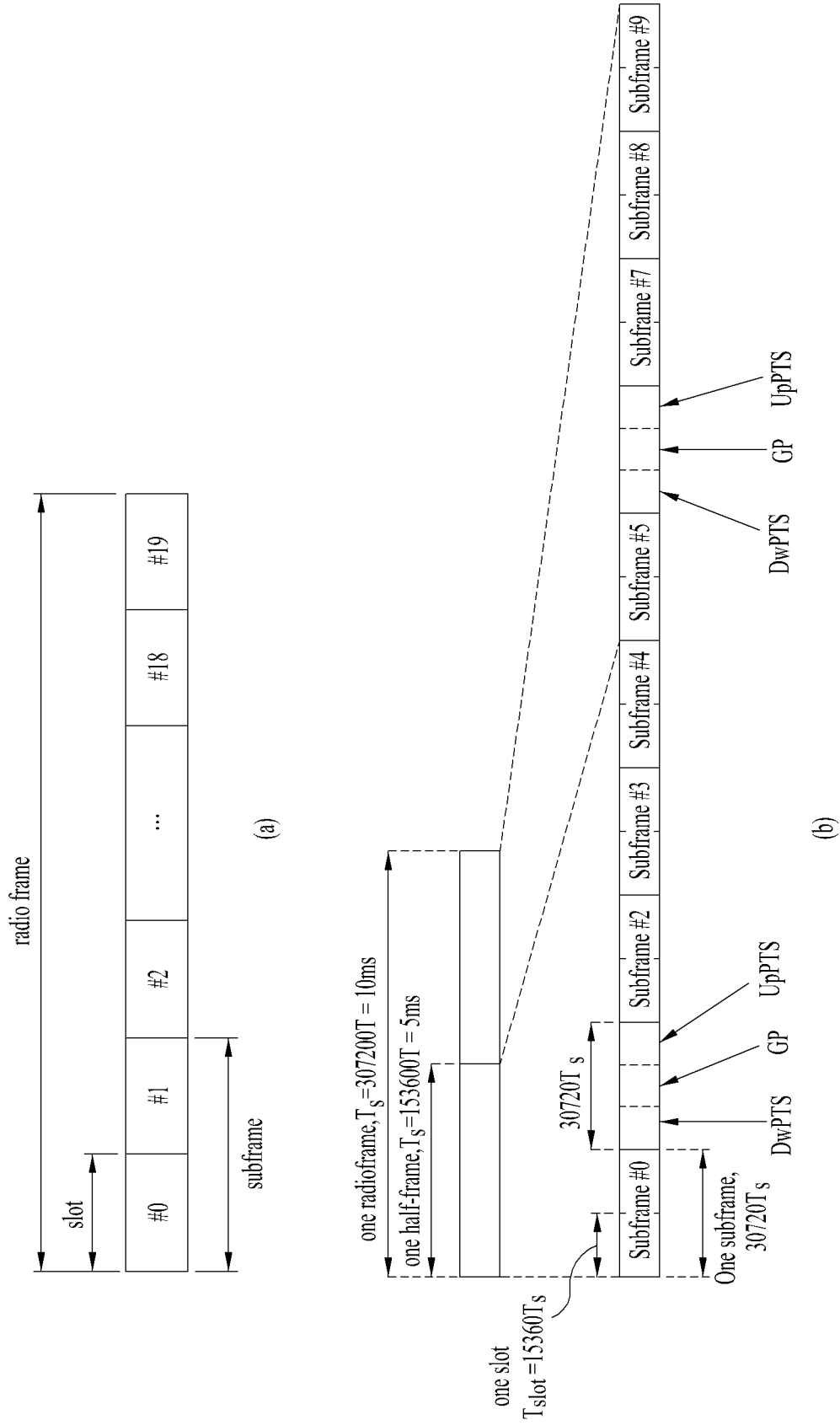
FIG. 2 illustrates a structure of a radio frame used in a 3GPP LTE.

FIG. 2 illustrates a structure of a radio frame used in a 3GPP LTE.

In a cellular orthogonal frequency division multiplexing (OFDM) wireless packet communication system, UL/DL data packets are transmitted in subframes. One subframe is defined as a predetermined time interval including a plurality of OFDM symbols. The 3GPP LTE standard supports a type 1 radio frame structure applicable to frequency division duplex (FDD) and a type 2 radio frame structure applicable to time division duplex (TDD).

FIG. 2(a) is a diagram illustrating the structure of the type 1 radio frame. A DL radio frame includes 10 subframes, each subframe including two slots in the time domain. A time required for transmitting one subframe is defined as a transmission time interval (TTI). For example, one subframe may be 1 ms long and one slot may be 0.5 ms long. One slot includes a plurality of OFDM symbols in the time domain and a plurality of resource blocks (RBs) in the frequency domain. Since the 3GPP LTE system uses OFDMA for DL, an OFDM symbol may be one symbol period. The OFDM symbol may be called an SC-FDMA symbol or symbol period. An RB is a resource allocation unit including a plurality of contiguous subcarriers in one slot.

The number of OFDM symbols included in one slot may be changed according to the configuration of a cyclic prefix (CP). There are two types of CPs, extended CP and normal CP. For example, if each OFDM symbol is configured to include a normal CP, one slot may include 7 OFDM symbols. If each OFDM symbol is configured to include an extended CP, the length of an OFDM symbol is increased and thus the number of OFDM symbols included in one slot is less than that in the case of a normal CP. In the case of the extended CP, for example, one slot may include 6 OFDM symbols. If a channel state is instable as is the case with a fast UE, the extended CP may be used in order to further reduce inter-symbol interference.

In the case of the normal CP, since one slot includes 7 OFDM symbols, one subframe includes 14 OFDM symbols. Up to first three OFDM symbols of each subframe may be allocated to a PDCCH and the remaining OFDM symbols may be allocated to a PDSCH.

FIG. 2(b) illustrates the structure of the type 2 radio frame. The type 2 radio frame includes two half frames, each half frame including 5 subframes, a downlink pilot time slot (DwPTS), a guard period (GP), and an uplink pilot time slot (UpPTS). One subframe is divided into two slots. The DwPTS is used for initial cell search, synchronization, or channel estimation at a UE, and the UpPTS is used for channel estimation and UL transmission synchronization with a UE at an eNB. The GP is used to cancel UL interference between UL and DL, caused by the multi-path delay of a DL signal.

UL-DL configuration of the type 2 radio frame structure of a TDD system refers to a rule indicating whether UL and DL are allocated (or reserved) to all subframes. Table 1 shows an exemplary uplink-downlink configuration.

TABLE 1

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 3 above, for each respective subframe of a radio frame, "D" denotes a downlink subframe, "U" denotes an uplink subframe, and "S" denotes a special subframe including three fields of a DwPTS, a GP, and a an UpPTS. The UL-DL configuration may be classified into 7 types, and for each respective configurations, the locations and numbers of DL subframes, special subframes, and UL subframes are varied.

A point in time for converting DL into UL or a pint in time for converting UL into DL is referred to as a switching point. A switch-point periodicity refers to a period with which an operation of conversion between a UL subframe and a DL subframe is repeated and supports both 5 ms and 10 ms. In the case of DL-UL switch-point periodicity of 5 ms, a special subframe S is present every half-frame. In the case of DL-UL switch-point periodicity of 5 ms, a special subframe S is present only in a first half-frame.

In all configurations, subframes #0 and #5 and a DwPTS are period for DL transmission only. The UpPTS, a subframe, and a subframe immediately subsequent thereto are always periods for UL transmission.

The UL-DL configuration may be system information and may be known to both an eNB and a UE. Whenever UL-DL configuration information is changed, the eNB may transmit only an index of configuration information to notify the UE of information about change in UL-DL allocation state of a radio frame. In addition, the configuration information may be transmitted as a type of DL control information through a physical downlink control channel (PDCCH) and may be commonly transmitted as a type of broadcast information to all UEs in a cell through a broadcast channel like other scheduling information and The aforementioned radio frame structure is purely exemplary. The number of subframes included in a radio frame or the number of slots included in each subframe, and the number of symbols of each slot can be changed in various ways.

Figure 3:
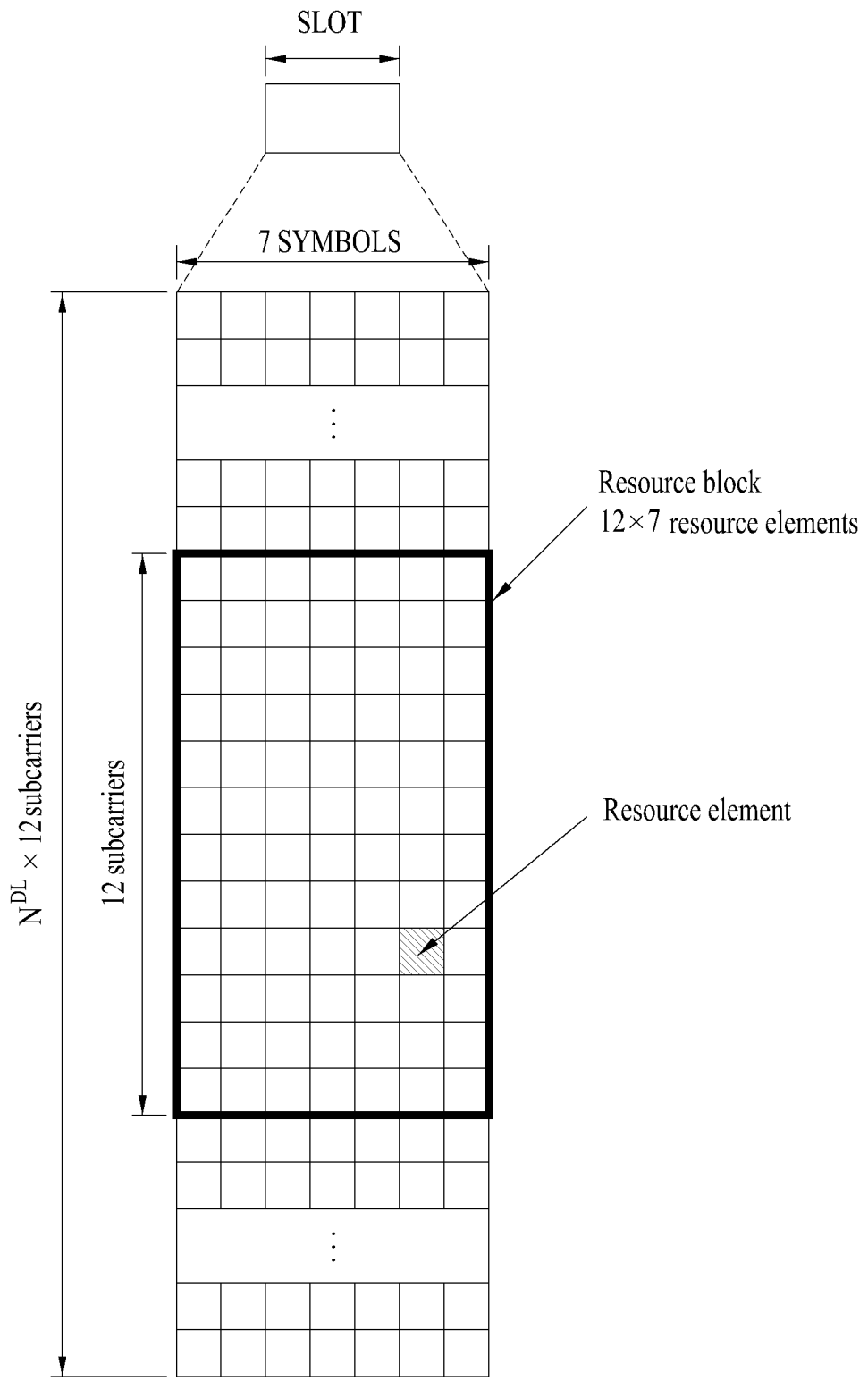
FIG. 3 illustrates the structure of a downlink (DL) resource grid for the duration of one DL slot.

FIG. 3 illustrates the structure of a DL resource grid for the duration of one DL slot. Referring to FIG. 3, one DL slot includes a plurality of OFDM symbols in the time domain Here, one DL slot includes 7 OFDM symbols and one resource block includes 12 subcarriers in the frequency symbol, which is purely exemplary, but embodiments of the present invention are not limited thereto.

Each element of the resource grid is referred to as a resource element (RE). An RB includes 12×7 REs. The number of RBs in a DL slot, $N^{DL}$ depends on a DL transmission bandwidth. A UL slot may have the same structure as a DL slot.

Figure 4:
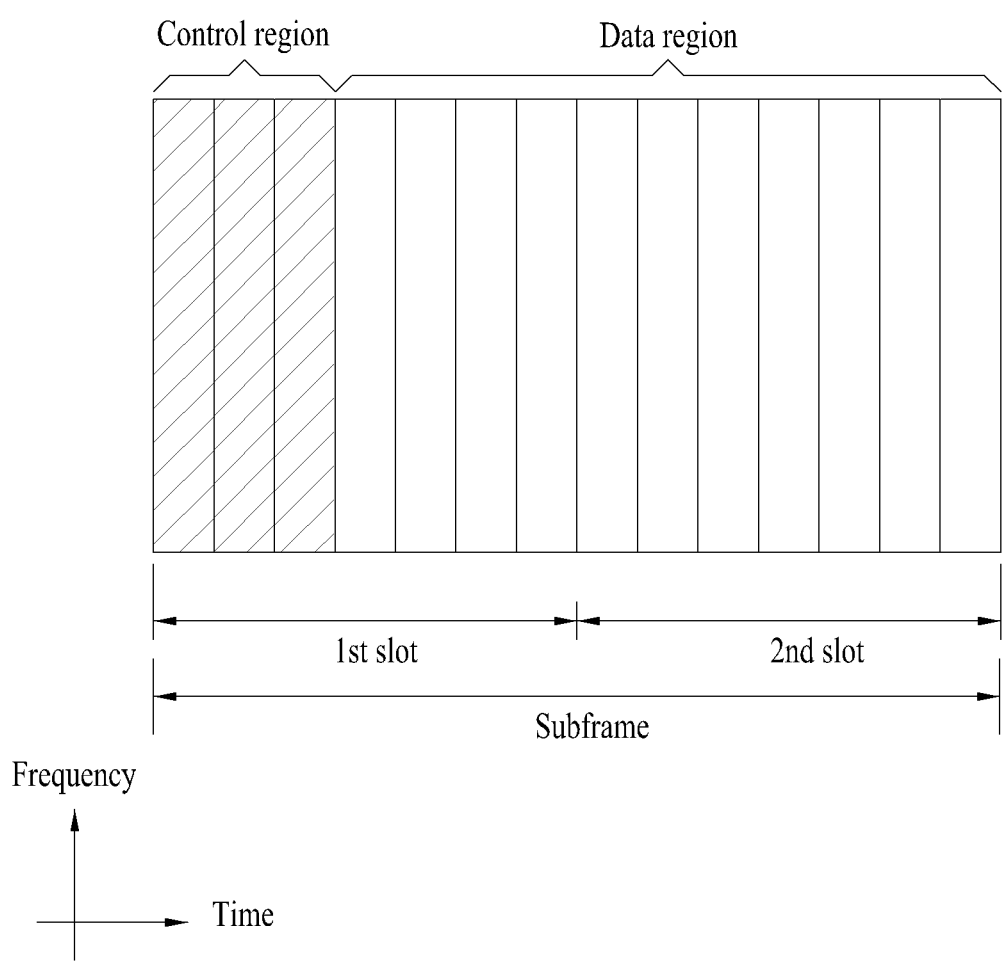
FIG. 4 illustrates a structure of a DL subframe.

FIG. 4 illustrates a structure of a DL subframe.

Referring to FIG. 4, up to three or four OFDM symbols at the start of the first slot of a DL subframe are used as a control region to which control channels are allocated and the other OFDM symbols of the DL subframe are used as a data region to which a PDSCH is allocated. DL control channels defined for the 3GPP LTE system include a physical control format indicator channel (PCFICH), a physical downlink control channel (PDCCH), and a physical hybrid-ARQ indicator channel (PHICH).

The PCFICH is located in the first OFDM symbol of a subframe, carrying information about the number of OFDM symbols used for transmission of control channels in the subframe. The PHICH delivers an HARQ ACK/NACK signal as a response to a UL transmission. Control information carried on the PDCCH is called downlink control information (DCI). The DCI transports resource allocation information and other control information for a UE or a UE group. For example, the DCI includes DL/UL scheduling information, UL transmission (Tx) power control commands, etc.

The PDCCH delivers information about resource allocation and a transport format for a downlink shared channel (DL-SCH), information about resource allocation and a transport format for an uplink shared channel (UL-SCH), paging information of a paging channel (PCH), system information on the DL-SCH, information about resource allocation for a higher-layer control message such as a random access response transmitted on the PDSCH, a set of Tx power control commands for individual UEs of a UE group, Tx power control commands, voice over Internet protocol (VoIP) activation indication information, etc. A plurality of PDCCHs may be transmitted in the control region. A UE may monitor a plurality of PDCCHs. A PDCCH is transmitted in an aggregate of one or more consecutive Control Channel Elements (CCEs). A CCE is a logical allocation unit used to provide a PDCCH at a coding rate based on the state of a radio channel. A CCE includes a plurality of RE groups (REGs). The format of a PDCCH and the number of available bits for the PDCCH are determined according to the number of CCEs and a coding rate provided by the CCEs.

An eNB determines a PDCCH format according to DCI transmitted to a UE and adds a cyclic redundancy check (CRC) to control information. The CRC is masked by an identifier (ID) known as a radio network temporary identifier (RNTI) according to the owner or usage of the PDCCH. If the PDCCH is destined for a specific UE, the CRC may be masked by a cell-RNTI (C-RNTI) of the UE. If the PDCCH carries a paging message, the CRC of the PDCCH may be masked by a paging indicator identifier (P-RNTI). If the PDCCH carries system information, particularly, a system information block (SIB), its CRC may be masked by a system information ID and a system information RNTI (SI-RNTI). To indicate that the PDCCH carries a random access response to a random access preamble transmitted by a UE, its CRC may be masked by a random access-RNTI (RA-RNTI).

Figure 5:
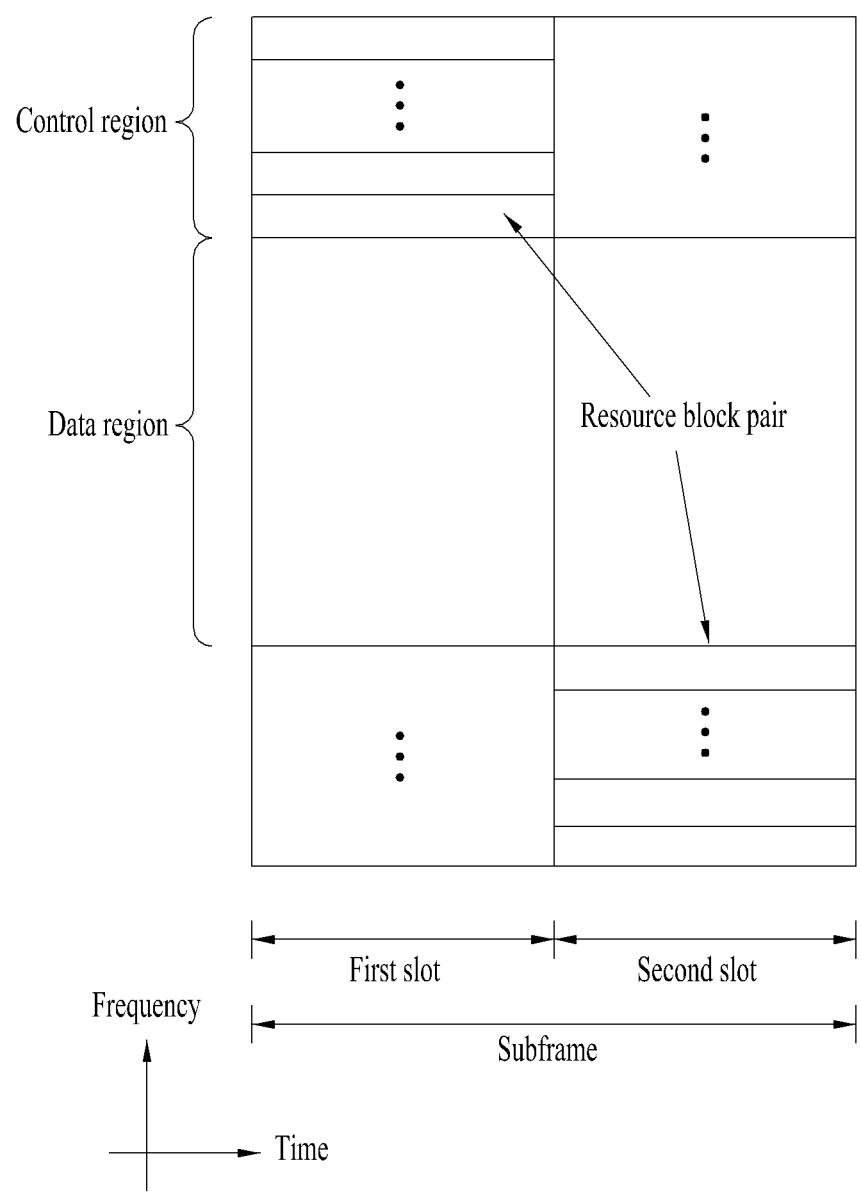
FIG. 5 illustrates a structure of an uplink (UL) subframe.

FIG. 5 illustrates a structure of a UL subframe.

Referring to FIG. 5, a UL subframe may be divided into a control region and a data region in the frequency domain. The control region includes a PUCCH that carriers UL control information. The data region includes a PUSCH that carrier user data. In order to maintain single carrier wave properties, one UE may not simultaneously transmit a PUCCH and a PUSCH. An RB pair is allocated to a PUCCH of one UE in a subframe. RBs included in an RB pair occupy different subcarriers in two respective slots. The RB pair allocated to the PUCCH frequency-hops over a slot boundary.

1.2. DL Measurement

In a mobile communication system, a packet (or signal) is transmitted on a radio channel from a transmitter to a receiver. In view of the nature of the radio channel, the packet may be distorted during the transmission. To receive the signal successfully, the receiver should compensate for the distortion in the received signal using channel information. Generally, to enable the receiver to acquire the channel information, the transmitter transmits a signal known to both the transmitter and the receiver and the receiver acquires knowledge of channel information based on the distortion of the signal received on the radio channel. The signal known to both the transmitter and receiver is referred to as a pilot signal or a reference signal (RS).

In transmission and reception of data using multiple antennas, the receiver needs to know channel states between transmit antennas and receive antennas to successfully receive a signal. Accordingly, a separate reference signal is needed for each transmit antenna.

In a wireless communication system, an RS can be largely classified into two types according to its purpose. The RS includes an RS for channel information acquisition and an RS for data demodulation. The former is used for acquisition of channel information to DL by a UE. Thus the former RS needs to be transmitted in a wideband, and even a UE that does not receive DL data in a specific subframe needs to receive and measure the RS. In addition, the RS for channel measurement may also be used for measurement of handover, etc. The latter is an RS that is transmitted together with corresponding resource when an eNB transmits a DL signal. In this regard, the UE can receive the corresponding RS to estimate a channel and accordingly demodulate data. The RS for data demodulation needs to be transmitted in a region in which data is transmitted.

A 3GPP LTE system defines a common reference signal (CRS) shared by all UEs in a cell and a dedicated reference signal (DRS) for a specific UE only as a DL RS. The CRS may be used for both channel information acquisition and data demodulation and may also be referred to as a cell-specific RS. An eNB transmits the CRS every subframe over a wideband. On the other hand, the DRS may be used for data demodulation only and may be transmitted through REs when data modulation on a PDSCH is required. The UE may receive whether the DRS is present through a higher layer and determines that the DRS is valid only when the corresponding PDSCH is mapped. The DRS may be referred to as a UE-specific RS or a demodulation RS (DMRS).

A receiver (UE) may estimate a channel state from the CRS and feedback an indicator associated with channel quality, such as a channel quality indicator (CQI), a precoding matrix index (PMI), and/or a rank indicator (RI) to a transmitter (eNB). In addition, the receiver may define an RS associated with feedback of channel state information (CSI) such as CQI/PMI/RI as a separate CSI-RS. A CSI-RS for channel measurement is designed mainly for channel measurement unlike an existing CRS used for data demodulation as well as channel measurement, etc. Since the CSI-RS is transmitted only for transmission of information about a channel state, the eNB transmits CSI-RSs about all antenna ports. In addition, the CSI-RS is transmitted for knowledge of DL channel information and thus is transmitted over all bands unlike a DRS.

A current 3GPP LTE system defines two types of a closed-loop MIMO transmission scheme and an open-loop MIMO scheme managed without channel information of the receiver. In the closed-loop MIMO, in order to achieve multiplexing gain of a MIMO antenna, each of the transmitter and the receiver performs beamforming based on channel information, that is, channel state information (CSI). The eNB may command the UE to allocate a physical uplink control channel (PUCCH) or a physical uplink shared channel (PUSCH) and to feedback DL CSI in order to acquire CSI from the UE.

CSI is classified largely into three information types, a rank indicator (RI), a precoding matrix index (PMI), and a channel quality indication (CQI).

An RI is information about a channel rank that is the number of signal streams (or layers) that a UE can receive in the same time-frequency resources. Because the RI is determined dominantly according to the long-term fading of a channel, the RI may be fed back to an eNB in a longer period than a PMI and a CQI.

A PMI is the index of a UE-preferred eNB precoding matrix determined based on a metric such as signal to interference and noise ratio (SINR), reflecting the spatial characteristics of channels. The PMI reflects channel spatial characteristics and indicates a precoding index of an eNB preferred by a UE based on a metric such as a signal to interference plus noise ratio (SINR), etc. That is, the PMI is information about a precoding matrix used for transmitted from a transmitter. The precoding matrix fed back from a received is determined in consideration of the number of a layer indicted by an RI. The PMI may be fed back in case of closed-loop spatial multiplexing (SM) and large delay cyclic delay diversity (CDD). In the case of open-loop transmission, the transmitter may select a precoding matrix according to predetermined rules. A process for selecting a PMI for each rank is as follows. The receiver may calculate a post processing SINR in each PMI, convert the calculated SINR into the sum capacity, and select the best PMI on the basis of the sum capacity. That is, PMI calculation of the receiver may be considered to be a process for searching for an optimum PMI on the basis of the sum capacity. The transmitter that has received PMI feedback from the receiver may use a precoding matrix recommended by the receiver. This fact may be contained as a 1-bit indicator in scheduling allocation information for data transmission to the receiver. Alternatively, the transmitter may not use the precoding matrix indicated by a PMI fed back from the transmitter. In this case, precoding matrix information used for data transmission from the transmitter to the receiver may be explicitly contained in the scheduling allocation information.

A CQI represents a channel strength and in general reflects a reception SINR that the eNB can achieve with a PMI. A UE reports CQI index to an eNB. The CQI index indicates a specific combination of a set including combination of a predetermined modulation scheme and code rate.

In an evolved communication system such as LTE-A, additional multi-user diversity gain is obtained using multi-user MIMO (MU-MIMO). The MU-MIMO technology refers to a method of a scheme in which an eNB assigns antenna resources to different UEs and selects and schedules a UE that can have a high data transfer rate for each antenna.

For the multi-user diversity gain, higher accuracy is required from a viewpoint of a channel feedback. Since interference is present between UEs multiplexed in the antenna domain in MU-MIMO, accuracy of CSI may largely affect not only a UE that reports the CSI but also interference of other multiplexed UEs. Accordingly, in order to enhance the accuracy of a feedback channel in LTE-A system, a final PMI may be determined to be divided into W1 corresponding to a long-term and/or wideband PMI and W2 corresponding to a short-term and/or subband PMI and may be determined as a combination of W1 and W2.

For example, the long-term covariance matrix of channels expressed as [Equation 1] may be used for hierarchical codebook transformation that configures one final PMI with W1 and W2 from information of two channels.

$$W = \text{norm}(W1\,W2) \quad \text{[Equation 1]}$$

In [Equation 1], W2 is a short-term PMI, which is a codeword of a codebook reflecting short-term channel information, W1 is a long-term covariance matrix, and norm(A) is a matrix obtained by normalizing the norm of each column of matrix A to 1. W is a codeword of a final transformed codebook. Conventionally, W1 and W2 are given according to [Equation 2] below.

$$W1(i) = \begin{bmatrix} X_i & 0 \\ 0 & X_i \end{bmatrix}, \text{ where } X_i \text{ is } Nt/2 \text{ by } M \text{ matrix.} \quad \text{[Equation 2]}$$

$$W2(j) = \overbrace{\begin{bmatrix} e_M^k & e_M^l & & e_M^m \\ \alpha_j e_M^k & \beta_j e_M^l & \cdots & \gamma_j e_M^m \end{bmatrix}}^{r\text{ columns}}$$

(if rank = r), where $1 \le k, l, m \le M$ and $k, l, m$ are integer.

In [Equation 2] above, the codewords are designed so as to reflect correlation characteristics between established channels, if cross polarized antennas are arranged densely (for example, the distance between adjacent antennas is equal to or less than a half of a signal wavelength. The cross polarized antennas may be divided into a horizontal antenna group and a vertical antenna group and the two antenna groups are co-located, each having the property of a uniform linear array (ULA) antenna. Therefore, the correlations between antennas in each group have the same linear phase increment property and the correlation between the antenna groups is characterized by phase rotation. Since a codebook is eventually quantized values of channels, it is necessary to design a codebook, reflecting channel characteristics. For the convenience of description, a rank-1 codeword designed according to [Equation 2] may be given as [Equation 3] below.

$$W1(i) * W2(j) = \begin{bmatrix} X_i(k) \\ \alpha_j X_i(k) \end{bmatrix} \quad \text{[Equation 3]}$$

In [Equation 3] above, a codeword is expressed as an $N_T \times 1$ vector where NT is the number of Tx antennas and the codeword is composed of an upper vector $X_i(k)$ and a lower vector $\alpha_j X_i(k)$, representing the correlation characteristics of the horizontal and vertical antenna groups, respectively. Preferably, $X_i(k)$ is expressed as a vector having the linear phase increment property, reflecting the correlation characteristics between antennas in each antenna group. For example, a discrete Fourier transform (DFT) matrix may be used for $X_i(k)$.

Higher accuracy is required for CoMP. In the case of CoMP JT, a plurality of eNBs collaboratively transmits the same data to a specific UE, and thus, a CoMP JT system may be academically considered as a MIMO system in which antennas are geographically distributed. That is, when the JT performs MU-MIMO, high level channel accuracy is also required in order to prevent co-scheduled UEs like single cell MU-MIMO. In the case of CoMP CB, accurate channel information is also required in order to prevent interference to a serving cell by an adjacent cell.

Recently, active research has been conducted into enhanced inter-cell interference coordination (eICIC) as an interference coordination method between UEs in a 3GPP LTE-A system. The eICIC is one of interference coordination methods. In this regard, according to the eICIC, a cell causing interference is defined as an aggressor cell or a primary cell, an interfered cell is defined as a victim cell or a secondary cell, the aggressor cell stops data transmission in some specific resource regions such that a UE can maintain access to the victim cell or secondary cell in the corresponding resource region. That is, time domain inter-cell interference coordination by which an aggressor cell uses a silent subframe that reduces transmission power/activity of some physical channels (including operation of setting zero power) and a victim cell schedules UEs in consideration of the silent frame can be used. The silent subframe may also be called an almost blank subframe (ABS). In this case, from a viewpoint of a UE positioned in the victim cell, an interference level largely changes according to whether the silent subframe is present, and signals transmitted from the aggressor cell and the victim cell may act as interference to a UE positioned at a boundary between the aggressor cell and the victim cell.

In this situation, to perform more accurate radio link monitoring (RLM) in each subframe or radio resource management (RRM) for measuring reference signal received power (RSRP)/reference signal received quality (RSRQ) or to measure channel state information (CSI) for link adaptation, the aforementioned monitoring/measurement needs to be limited to subframe sets having uniform interference characteristics.

In 3GPP LTE system, the following restricted RLM and RRM/CSI measurement is defined.

1) RLM

The DL radio link quality may be monitored by a physical layer of a UE in order to indicate an 'out-of-sync' or 'in-sync' status to higher layers.

In the case of a non-discontinuous reception (DRX) mode operation, the physical layer in the UE compares a value measured over a previous time period every radio frame with thresholds ($Q_{out}$ and $Q_{in}$) to monitor radio link quality. On the other hand, in the case of a DRX mode operation, the physical layer in the UE compares a value measured over a previous time period every DRX period at least once to monitor radio link quality. Here, if higher layer signaling indicates specific subframes for restricted radio link monitoring, the radio link quality is not monitored by other subframes other than the indicated subframes.

The physical layer in the UE indicates 'out-of-sync' to higher layers when the radio link quality is worse than the threshold $Q_{out}$ in radio frames in which the radio link quality is assessed. That is, the 'out-of-sync' indication is an event that occurs when a UE measures the channel quality of a signal from a serving eNB and the channel quality is degraded to a predetermined level or less. Here, the channel quality may be measured from a signal-to-noise ratio (SNR) measured using a cell-specific reference signal (CRS) of a DL signal from the eNB. In addition, the 'out-of-sync' indication may be provided to higher layers when a PDCCH received from lower layers (physical layers) cannot be demodulated or signal-to-interference plus noise ratio (SINR) is low.

On the other hand, when the physical layer in the UE is better than the threshold $Q_{in}$ in radio frames in which the radio link quality is assessed, 'in-sync' is indicated to higher layers. That is, the 'in-sync' indication is an event that occurs when a UE measures the channel quality of a signal from a serving eNB and the channel quality is increased to a predetermined level or more.

2) Channel Quality Indicator (CQI)

CQI is information regarding channel quality. CQI may be represented by a predetermined MCS combination. CQI index may be given as shown in Table 2 below.

Table 2 shows CQI index.

TABLE 2

| CQI index | modulation | code rate x 1024 | efficiency |
|---|---|---|---|
| 0 | | out of range | |
| 1 | QPSK | 78 | 0.1523 |
| 2 | QPSK | 120 | 0.2344 |
| 3 | QPSK | 193 | 0.3770 |
| 4 | QPSK | 308 | 0.6016 |
| 5 | QPSK | 449 | 0.8770 |
| 6 | QPSK | 602 | 1.1758 |
| 7 | 16QAM | 378 | 1.4766 |
| 8 | 16QAM | 490 | 1.9141 |
| 9 | 16QAM | 616 | 2.4063 |
| 10 | 64QAM | 466 | 2.7305 |
| 11 | 64QAM | 567 | 3.3223 |
| 12 | 64QAM | 666 | 3.9023 |
| 13 | 64QAM | 772 | 4.5234 |
| 14 | 64QAM | 873 | 5.1152 |
| 15 | 64QAM | 948 | 5.5547 |

Table 3 below shows a PDSCH transmission scheme for CSI reference resource.

TABLE 3

| Transmission mode | Transmission scheme of PDSCH |
|---|---|
| 1 | Single-antenna port, port 0 |
| 2 | Transmit diversity |
| 3 | Transmit diversity if the associated rank indicator is 1, otherwise large delay CDD |
| 4 | Closed-loop spatial multiplexing |
| 5 | Multi-user MIMO |
| 6 | Closed-loop spatial multiplexing with a single transmission layer |
| 7 | If the number of PBCH antenna ports is one, Single-antenna port, port 0; otherwise Transmit diversity |
| 8 | If the UE is configured without PMI/RI reporting: if the number of PBCH antenna ports is one, single-antenna port, port 0; otherwise transmit diversity If the UE is configured with PMI/RI reporting: closed-loop spatial multiplexing |
| 9 | If the UE is configured without PMI/RI reporting: if the number of PBCH antenna ports is one, single-antenna port, port 0; otherwise transmit diversity Closed-loop spatial multiplexing with up to 8 layer transmission, ports 7-14 (see subclause 7.1.5B) |

Referring to Table 2 above, CQI index may be represented by 4 bits (i.e., CQI indexes of 0-15). Each CQI index may indicate a modulation scheme and a code rate.

A 3GPP LTE/LTE-A system defines that the following assumptions are considered in order to calculate CQI index by a UE from CSI reference resource.

(1) The first three OFDM symbols in one subframe are occupied by control signaling.

(2) Resource elements (REs) used by a primary synchronization signal, a secondary synchronization signal or a physical broadcast channel (PBCH) are not present.

(3) CP length of a non-MBSFN subframe is assumed.

(4) Redundancy version is set to zero (0).

(5) In the case of CSI reporting in transmission mode 9, when a UE configures PMI/RI reporting, DMRS overhead is the same as most recently reported rank.

(6) REs used for CSI-RS and zero-power CSI-RS are not present.

(7) REs used for Positioning Reference Signal (PRS) are not present.

(8) PDSCH transmission method may be dependent upon a current transmission mode (e.g., a default mode) configured in a LTE and given according to Table 3 above.

(9) The ratio of PDSCH EPRE (energy per resource element) to a cell-specific reference signal EPRE may be given with the exception of $\rho_A$. (A detailed description of $\rho_A$ may follow the following assumption. Provided that a UE for an arbitrary modulation scheme may be set to transmission mode 2 having four cell-specific antenna ports or may be set to transmission mode 3 having an RI of 1 and four cell-specific antenna ports, $\rho_A$ may be denoted by $\rho_A = P_A + \Delta_{offset} + 10\log_{10}(2)[dB]$. In the remaining cases, in association with an arbitrary modulation method and the number of arbitrary layers, $\rho_A$ may be denoted by $\rho_A = P_A + \Delta_{offset}[dB]$. $\Delta_{offset}$ is given by a nomPDSCH-RS-EPRE-Offset parameter configured by higher layer signaling.)

Definition of the above-mentioned assumptions may indicate that CQI includes not only information regarding channel quality but also various information of a corresponding UE. That is, different CQI indexes may be fed back according to a throughput or performance of the corresponding UE at the same channel quality, so that it is necessary to define a predetermined reference for the above-mentioned assumption.

Conventional RLM/RRM measurement on a serving cell is performed using a CRS. However, since precoding is applied in a transmission mode (e.g., transmission mode 9) using a DMRS, the RLM/RRM measurement may be different from measurement on link in which actual transmission is performed. Accordingly, when a PMI/RI reporting mode is configured in transmission mode 9, the UE performs channel measurement in order to calculate a CQI value based on a CSI reference signal only. On the other hand, when the PMI/RI reporting mode is not configured in transmission mode 9, the UE performs channel measurement for CQI calculation based on the CRS.

A procedure in which the UE recognizes a channel state to obtain a proper MCS may be designed in various ways for embodiment of the UE. For example, the UE may calculate a channel state or valid signal-to-interference plus noise ratio (SINR) using a reference signal. In addition, the channel state or the valid SINR can be measured on an entire system bandwidth (which is referred to as set S) or on a partial bandwidth (specific subband or specific RB). CQI of the entire system bandwidth (set S) may be referred to as a wideband (WB) CQI and CQI of the partial bandwidth may be referred to as a subband (SB) CQI. The UE may obtain the highest MCS based on the calculated channel state or valid SINR. The highest MCS refers to MCS satisfying the assumption of the CQI calculation in which a decoding transfer block error rate does not exceed 10%. The UE may determine a CQI index associated with the calculated MCS and report the determined CQI index to the eNB.

In an LTE/LTE-A system, CSI reference resource for CSI feedback/report is defined. The CSI reference resource is defined as a group of DL physical resource blocks (PRBs) corresponding to a frequency band associated with the calculated CQI in the frequency domain. In addition, the CSI reference resource is defined as a single DL subframe $n - n_{CQI\_ref}$ in the time domain. Here, n is a UL subframe index for CSI transmission/report.

In the case of periodic CSI reporting, $n_{CQI\_ref}$ has a smallest value corresponding to a valid DL subframe among values equal to or more than 4. That is, $n_{CQI\_ref}$ corresponds to a valid DL subframe that is most close to a UL subframe for CSI reporting among at least $4^{th}$ previous subframes in a UL subframe for CSI reporting. In addition, in the case of aperiodic CSI reporting, the CSI reference resource may be the same as a valid DL subframe in which corresponding CSI request in UL DCI format (e.g., DCI format 0) is transmitted. In addition, in the aperiodic CSI reporting, when the corresponding CSI request is transmitted in random access response grant in the DL subframe $n - n_{CQI\_ref}$, $n_{CQI\_ref}$ is 4.

In addition, when CSI subframe sets ($C_{CSI,0}$, $C_{CSI,1}$) are configured for a corresponding UE by a higher layer, each CSI reference resource may be included in any one of two subframe sets ($C_{CSI,0}$, $C_{CSI,1}$) but cannot be included in the both subframes.

A DL subframe can be valid if i) it is configured as a DL subframe for a corresponding UE, ii) it is not a multicast-broadcast single frequency network (MBSFN) subframe except for transmission mode 9, iii) it does not contain a DwPTS field when a length of the DwPTS in a special subframe of a TDD system is equal to or less than a predetermined length, iv) it is not contained in a measurement gap configured for the corresponding UE, and vi) it is an element of the CSI subframe set associated with the periodic CSI report when the UE is configured with CSI subframes sets for periodic CSI reporting. On the other hand, if there is not valid DL subframe for the CSI reference resource, CSI reporting is omitted in UL subframe n.

3) Radio Resource Management (RRM)

Measurement for RRM may be largely classified into reference signal received power (RSRP), reference signal received quality (RSRQ), etc., and the RSRQ may be measured via a combination of RSRP and E-UTRA carrier received signal strength indicator (RSSI).

The RSRP is defined as a linear average of power distribution of resource elements in which a cell-specific reference signal (CRS) is transmitted in a measurement frequency band. For RSRP determination, a cell-specific reference signal (R0) corresponding to antenna port '0' may be used. For RSRP determination, a cell-specific reference signal (R1) corresponding to antenna port '1' may be further used. When reception diversity is used by the UE, the reported value may not be smaller than the corresponding RSRP of individual diversity branch. For RSRP determination, a measurement frequency band used by the UE and the number of resource elements used in a measurement period may be determined by the UE as long as corresponding accuracy requirements are satisfied. In addition, power per resource element may be determined from energy from a portion of a symbol except for a cyclic prefix (CP).

Reference signal received quality (RSRQ) is defined as N×RSRP/E-UTRA carrier received signal strength indicator (RSSI). Here, N is the number of resource blocks (REs) of an E-UTRA carrier RSSI measurement band. In addition, in the aforementioned formula, measurement of the numerator and the denominator may be achieved from a set of the same RB set.

The E-UTRA carrier RSSI includes a linear average of total reception power detected from all sources including a serving cell and non-serving cell of a co-channel, adjacent channel interference, thermal noise, etc. in OFDM symbols containing a reference symbol corresponding to antenna port '0' over N resource blocks in a measurement band. On the other hand, when specific subframes for performing RSRQ measurement are indicated via higher layer signaling, the RSSI is measured via all OFDM symbols in the indicated subframes. When reception diversity is used by the UE, the reported value may not be smaller than the corresponding RSRP of individual diversity branch.

2. Method of Measuring Communication State

The present invention proposes a method of measuring and reporting a communication state in each resource by a UE in order to notify a network of information about resource (UL resource or DL resource) in which the UE is supposed to communicate in an environment in which an eNB dynamically changes the amounts of UL and DL resources according to the volume of UL and DL traffic.

Figure 6:
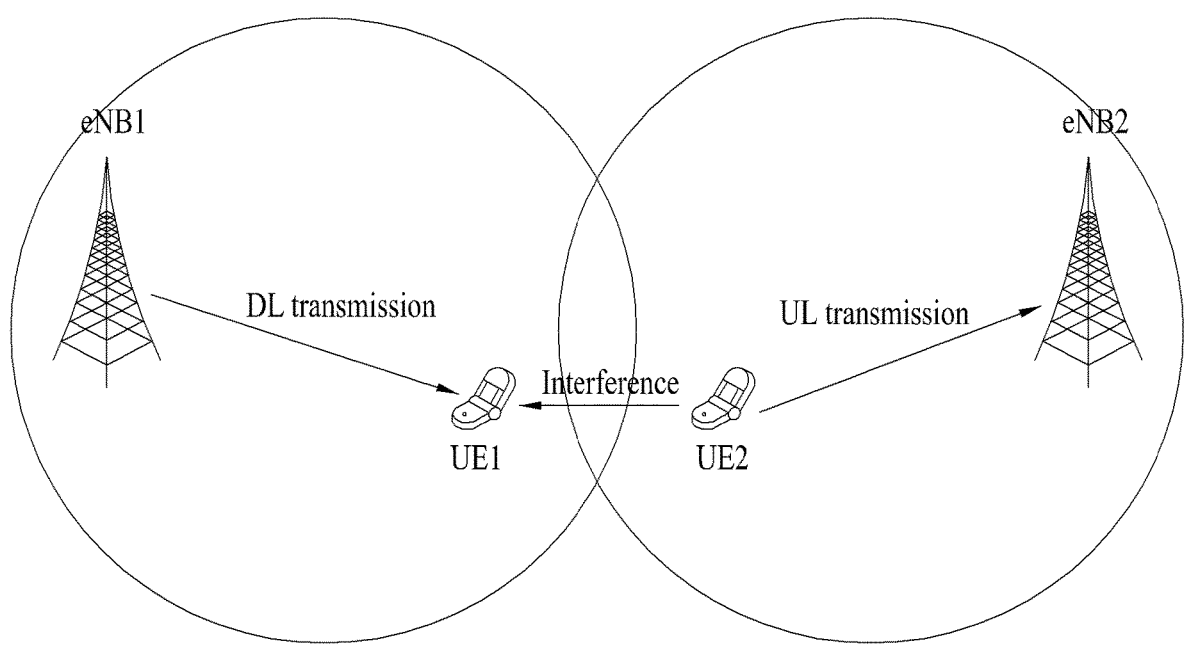
FIG. 6 is a schematic diagram illustrating a case in which two adjacent cells perform transmission in different directions in the same frequency/frequency resource.

FIG. 6 is a schematic diagram illustrating a case in which two adjacent cells perform transmission in different directions in the same frequency/frequency resource.

Referring to FIG. 6, in the same time/frequency resource of the two adjacent cells, an eNB 1 and a UE 1 perform DL transmission, whereas an eNB 2 in an adjacent cell and a UE 2 perform UL transmission. Likewise, when the two adjacent cells perform transmission in different directions in the same frequency/frequency resource, interference between cells increases compared with a case in which two cells perform transmission in the same direction (UL or DL), and a UE (e.g., a UE, etc. positioned at an boundary between cells) positioned at a specific location may be strongly interfered from the adjacent cell, and thus communication between the adjacent cells in different directions may be impossible. Accordingly, a UE may measure a communication state in UL resource and/or DL resource and report the communication stat to a network. In this case, it is very important to determine a combination (a combination of a communication direction of a serving cell that a UE attaches and a communication direction of an adjacent cell) of communication directions that are most appropriately for a situation of each UE and to schedule the corresponding UE in time/frequency resources corresponding to the combination.

Hereinafter, the present invention assumes a situation in which an eNB dynamically changes the amounts of UL/DL resources according to the volume of traffic. In order to achieve this dynamic change, the eNB may temporarily schedule UL transmission when UL traffic is high in resource configured as DL resource or temporarily schedule DL transmission toward the UE using resource configure as UL resource when DL traffic is high. Here, resource configured as UL resource refers to a UL band in an FDD system and refers to a UL subframe in a TDD system. On the other hand, resource configured as DL resource refers to a DL band in an FDD system and refers to a DL subframe in a TDD. For example, when an eNB notifies a plurality of un-specific UEs of information indicating that a specific subframe is configured as a UL subframe, if the volume of DL traffic is high, the eNB may temporarily notify a specific UE of information indicating that the corresponding subframe is converted to be used for DL transmission. In addition, a network may specify and separately configure resource, use of which is dynamically changed to UL/DL resources, and in this case it is obvious to also apply the principle of the present invention to this case.

Hereinafter, for clarity, it is assumed that DL resource (or a DL subframe) does not include UL resource (or a UL subframe), use of which is temporarily changed to DL transmission, and oppositely UL resource (or a UL subframe) does not include DL resource (or a DL subframe), use of which is temporarily changed to UL transmission.

According to the present invention, measurement includes RRM measurement such as RSRP, RSRQ, and RSSI defined in a 3GPP LTE system, or radio link monitoring (RLM) measurement for monitoring a current basic communication state with a serving cell. Hereinafter, for clarify, it is assumed that boundaries of UL/DL subframes between adjacent cells are aligned.

Figure 7:
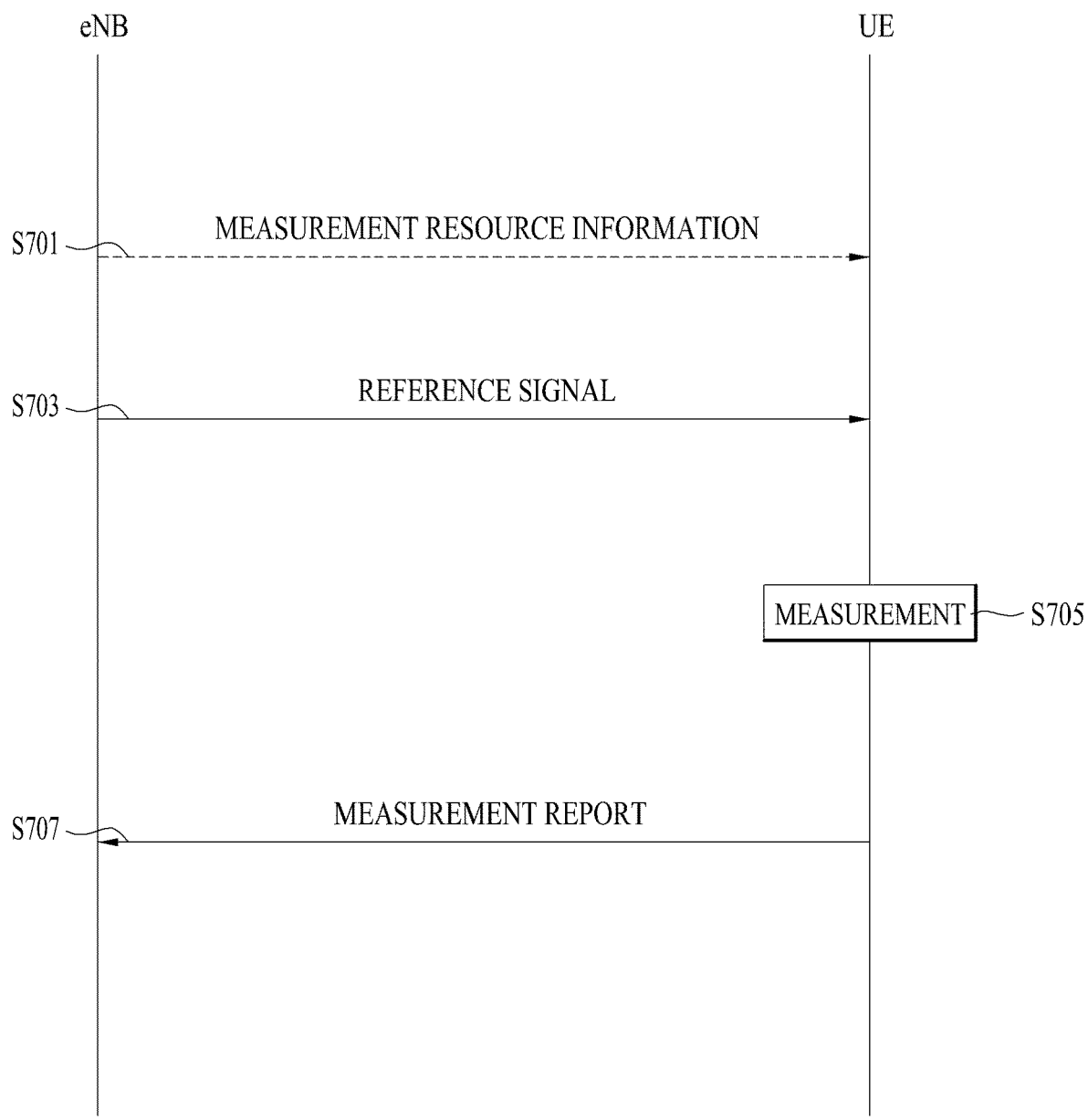
FIG. 7 is a diagram illustrating an example of a measurement method of a user equipment (UE) according to an embodiment of the present invention.

FIG. 7 is a diagram illustrating an example of a measurement method of a UE according to an embodiment of the present invention.

Referring to FIG. 7, when uses of UL resource and DL resource are dynamically changed, an eNB may transmit resource information configured for measurement of the UE to the UE (S701). Here, information about measurement information may be transmitted through a higher layer signal such as an RRC layer, a MAC layer signal, or a physical layer signal.

Since UL resource and DL resource are dynamically changed, the UE may perform measurement for DL resource and/or UL resource (in particular, UL resource used for DL) and the eNB may transmit the resource information for measurement of the UE for each respective resource. Here, the measurement resource may be determined in consideration of whether the same resource is used for DL or UL in an adjacent eNB. In detail, the eNB may limit resource for performing measurement for DL resource and/or UL resource by the UE to specific resource in consideration of whether the same resource is used for DL or UL in an adjacent eNB in order to receive stable report about measurement from the UE. In addition, the eNB may configure the UE to divide sets of resources for measurement of the UE and measure each set in consideration of whether the same resource is used for DL or UL in an adjacent eNB for each respective resource. In addition, the eNB may differently configure the measurement resource for each respective measurement metric. Resource for measurement of the UE may be pre-configured and known to the eNB and the UE. In this case, step S701 may be omitted.

The eNB transmits a reference signal to the UE in resource for measurement of the UE (S705). When the UE performs measurement for DL resource, the eNb may transmit a reference signal defined in a legacy system to the UE in the same way, and when the UE performs measurement for UL resource used for DL, the eNb may transmit a reference signal configured for measurement of the UE in the corresponding resource.

The UE may perform measurement for the corresponding resource configured as the measurement resource (S705) and periodically or aperiodically report the measurement result to the eNB (S707). Here, the measurement result may include a measured value measured by the UE in one or more subframes.

Hereinafter, a method for measuring a communication state according to the present invention will be described in detail.

2.1. Measurement

Hereinafter, for convenience of description, a communication state measurement method that is divided into measurement for UL resource and measurement for DL resource will be described with regard to the present invention. However, needless to say, measurement for UL resource and measurement for DL resource can be simultaneously performed by the same UE. In addition, described methods can be independently used but at least one or more methods can be combined and used.

2.1.1. Measurement for DL Resource

A UE may perform measurement for DL resource and in this case, follow a measurement definition defined in a legacy wireless access system (e.g., a 3GPP LTE system). This is because all measurements are defined for DL resource in a legacy system. For example, a CRS, a CSI-RS, or the like may be used as a reference signal for measurement for DL resource.

However, when the UE performs measurement for DL resource, inter-cell interferences may be much different according to whether the same time/frequency resource as resource in which measurement is performed is used for UL transmission or DL transmission in an adjacent cell.

Figure 8:
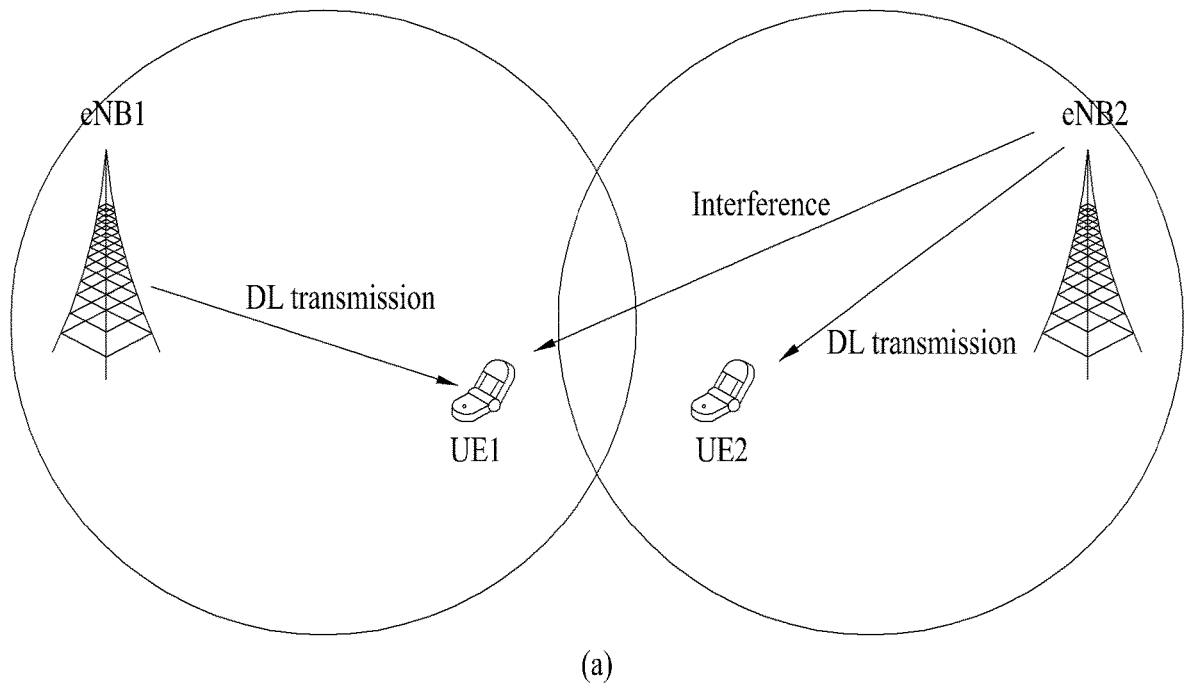
FIG. 8 is a schematic diagram illustrating a case in which a UE performs measurement for DL resource according to an embodiment of the present invention.
Figure 8:
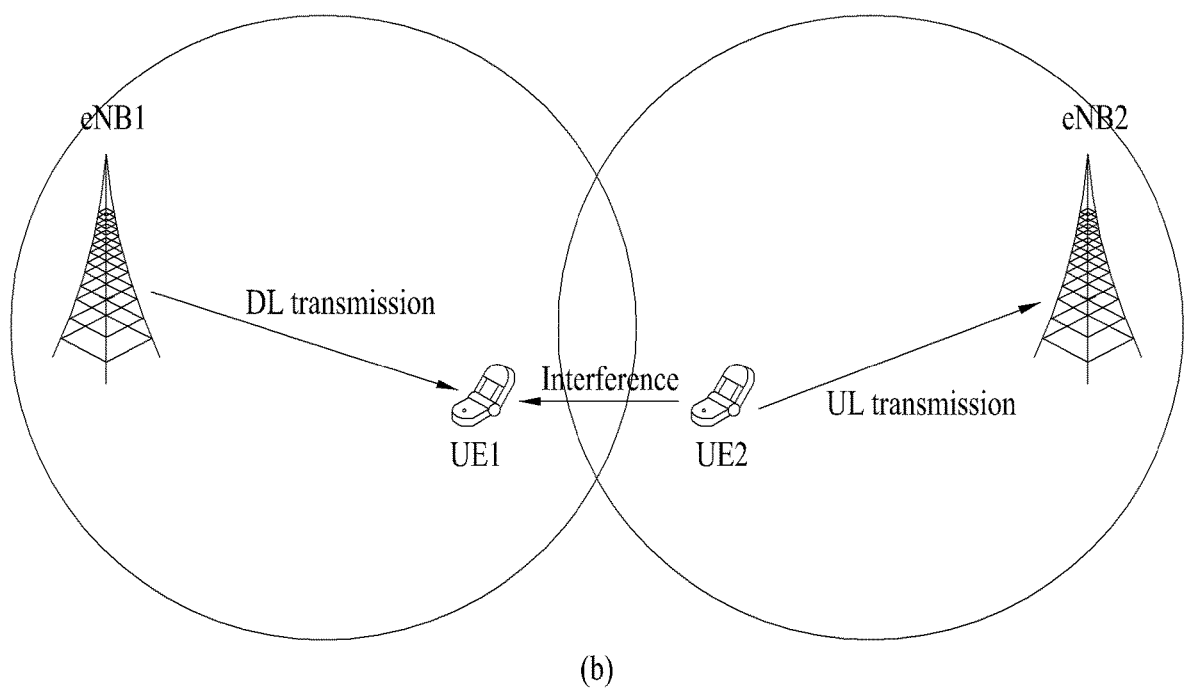

FIG. 8 is a schematic diagram illustrating a case in which a UE performs measurement for DL resource according to an embodiment of the present invention.

FIG. 8(a) illustrates a case in which, when a UE 1 positioned within coverage of an eNB 1 performs measurement for DL resource, an eNB 2 of an adjacent cell performs DL transmission on a UE 2 in resource in which the UE 1 performs measurement. FIG. 8(b) illustrates a case in which, when the UE 1 positioned within coverage of the eNB 1 performs measurement for DL resource, the eNB 2 of the adjacent cell receives UL transmission from the UE 2 in resource in which the UE 1 performs measurement.

In FIG. 8(a), the UE 1 receives interference from the adjacent eNB 2, but in FIG. 8(b), the UE 1 receives interference from the UE 2. That is, when a UE performs measurement for DL resource, inter-cell interferences monitored by the corresponding UE may be much different according to whether an adjacent cell performs UL transmission or DL transmission in the same time/frequency resource as resource in which DL measurement is performed. In particular, a UE positioned at a cell boundary may monitor very high interference due to a signal transmitted in UL by a UE of an adjacent cell that is very close to the UE.

To address this issue, an eNB may limit UL resource in which a UE (in particular, a UE positioned at a cell boundary) performs measurement to resource that is not used for UL transmission by an adjacent cell. In other words, the eNB may limit DL resource in which the UE performs measurement to resource in which an adjacent cell needs to perform UL transmission or performs DL transmission high possibility. That is, an eNB of each cell may transmit an index (or bitmaps of a plurality of subframes) of a DL subframe that the eNB needs to use for DL transmission or UL transmission or uses for DL transmission or UL transmission with very high possibility to an eNB of an adjacent cell. In this case, an eNB may compare a specific threshold with calculated possibility and notify an eNB of an adjacent cell of a subframe with possibility that is equal to or more than the specific threshold. In addition, the eNB may also transmit index (or bitmap) information of the subframe and information indicating use of resource at a corresponding location to the adjacent eNB.

An eNB of a serving cell that receives index (or bitmap) information of a DL subframe to be used for DL transmission from an eNB of an adjacent cell may configure a UE to perform measurement for DL resource of the serving cell in a corresponding subframe only. In addition, an eNB of a serving cell that receives index (or bitmap) information of a DL subframe to be used for UL transmission from an eNB of an adjacent cell may configure a UE to perform measurement for DL resource of the serving cell in the remaining resources except for the corresponding resource. That is, the eNB of the serving cell may configure a UE to perform measurement for DL resource of the serving cell in only resource used for DL transmission by an adjacent cell. In FIG. 8, from a viewpoint of the UE 1, FIG. 8(a) corresponds to the aforementioned limited resource. Likewise, the eNB of the serving cell may configure a UE to perform measurement for DL resource of the serving cell in the aforementioned limited resource only so as to receive stably report of the measurement result even in a situation in which an adjacent cell dynamically use of resource.

2.1.2. Measurement for UL Resource

A UE may perform measurement for UL resource separately from measurement for DL resource. This is because, during DL transmission in UL resource, the eNB can reduce transmission power of the eNB in order to reduce interference generated while an adjacent eNB receives a UL signal in the same time/frequency resource due to the DL transmission in UL resource, and accordingly, various measurement characteristics may be largely changed from DL measurement. Accordingly, the eNB may configure the UE to perform measurement for UL resource separately from measurement for DL resource, and the UE may perform separate measurement for UL resource according to this configuration and report the measurement to the eNB.

Likewise, in order for a UE to perform measurement for UL resource, a reference signal transmitted in UL resource is required. Here, a reference signal for measurement for UL may have a form of CRS or CSI-RS used for conventional DL measurement or may have a form of DMRS or SRS used as a reference signal for conventional UL measurement. That is, the eNB may transmit configuration information of a reference signal for measurement for UL resource to the UE, and an example of the configuration of the reference signal may include sequence information of the reference signal, cyclic shift information of the configured reference signal sequent, spreading code information, frequency shift information, etc. In addition, the reference signal for measurement for UL resource may be fixedly configured so as to be previously known to both the eNB and the UE.

From a viewpoint of time resource, it may be impossible to perform measurement by a UE in all UL subframes. This is because a specific within corresponding cell coverage needs to use at least some UL subframes for UL signal transmission to the eNB. Accordingly, similarly to measurement for DL resource, the eNB may configure some UL subframes as subframes in which the UE performs measurement and command the UE to perform in the corresponding subframe only.

In general, the measurement configuration of UL resource may be semi-statically configured via a higher layer signal such as radio resource control (RRC) layer, and thus in this case, the eNB may configure the UE to perform the measurement in UL subframes to be used for DL transmission with relatively high possibility among UL subframes. That is, an eNB of each cell may transmit information about at least one of offset or period of subframe of a subframe, or an index of a UL subframe that the eNB needs to use for DL transmission or uses for DL transmission with very high possibility to the UE via a higher layer signal. In this case, the eNB may compare a specific threshold with calculated possibility and notify the UE of a subframe with possibility that is equal to or more than the specific threshold.

However, in some situations, it may be more effective to still use an even UL subframe that is semi-statically configured to be used for DL transmission as a subframe for UL transmission according to a UL/DL traffic situation. Even if the UE performs measurement in a UL subframe to be expected to be used for UL transmission according to a signal of the eNB, when the corresponding UL subframe is actually used for UL transmission, serious distortion may occur in a measurement result of the UE due to influence of unintended interference. Thus, even in an environment in which use of a UL subframe is dynamically changed, the following method may be used in order to more effectively perform measurement of a UE in a UL subframe.

1) Operation According to Subframe Use Indicator

An eNB may indicate use (e.g., whether the corresponding UL subframe is used for UL transmission or DL transmission) of every UL subframe (or one or more subframes) via a physical layer signal or a media access control (MAC) layer signal. For example, the eNB may transmit information indicating use of every UL subframe (or one or more subframes) in the aforementioned semi-statically configured UL subframe, and a UE that receives the indication information from the eNB may determine only a UL subframe, use of which is indicated as DL transmission according to the indication information among UL subframes, as a valid measurement target. The indication information may be configured in an indicator form for indicating whether use of the corresponding subframe is for DL or UL.

2) Operation According to Scheduling Message Reception

A UE may receive a scheduling message about UL/DL transmission transmitted from an eNB and consider a UL subframe that is a target of the received scheduling message as a valid subframe as a measurement target. For example, upon receiving a message for scheduling DL transmission in a specific subframe, the UE may consider the corresponding UL subframe as a valid measurement target and perform measurement. Here, the scheduling information may be transmitted via a DL subframe or a UL subframe used for DL.

As another example, the eNB may notify the UE of a candidate group of UL subframes as a measurement target via a higher layer signal such as RRC. Then, when UL transmission from the corresponding UE is scheduled in a specific UL subframe among UL subframes included in the candidate group, the eNB may consider that the corresponding UL subframe is not a valid measurement target. In other words, the UE may determine that a UL subframe in which UL transmission is not scheduled among the candidate group of the UL subframes as a valid measurement target and perform measurement in the corresponding UL subframe. Here, the candidate group of the valid UL subframes as a measurement target may include UL subframes to be used for DL transmission by the eNB with relatively high possibility among the aforementioned UL subframes.

Likewise, the eNB may configure the UE to perform measurement in a UL subframe that is actually used for DL among UL subframes, and may further configure the UE to perform measurement for UL resource of a serving cell only in resource that is used for DL transmission by an adjacent cell among UL sufbrames that are actually used for DL as described in 2.1.1. above.

As described above, RSRQ of RRM measurement metric is defined as a ratio of RSRP and RSSI (that is, RSRQ is defined as N×RSRP/(E-UTRA carrier RSSI). In this regard, in an environment in which use of a subframe is dynamically changed, it may be difficult to transmit a reference signal in a UL subframe with a stable period. To address this issue, RSRQ of a UL subframe may be derived using RSRP measured in a DL subframe only and RSSI measured in a UL subframe only. That is, the UE may not perform RSRP measurement in a UL subframe and may perform RSRP measurement only in a DL subframe in which stable transmission is possible. In addition, the UE may perform RSSI measurement in a UL subframe used for DL transmission in order to an actual interference situation. In other words, the UE may measure the RSRP in a DL subframe using the method described in 2.1.1. above, measure the RSSI in a UL subframe used for DL transmission using the method described in 2.1.2. above, and report RSRQ of a UL subframe to the eNB using the measured RSRP and RSSI.

Like the aforementioned definition of the RSSI, since the RSSI is a value corresponding to total power of all signals received by the UE and can be measured using all time/frequency resources in a valid subframe for measuring of the UE, the RSSI less requires measurement resource than the RSRP that can be measured in a specific resource element (RE), the above operation may be possible. In addition, when an eNB reduces transmission power of a reference signal compared with a DL subframe in a UL subframe, the eNB may signal a power difference of reference signals between a UL subframe and a UL subframe, and an UE may reflect the power difference during RSRQ calculation in a UL subframe. That is, since the RSRP can be measured in a DL subframe only and the RSSI can be measured in a UL subframe only, the UE may match transmission power of reference signals transmitted in UL and DL subframes to the same level to calculate the RSRQ. For example, the RSRP value measured only in the DL subframe and/or the RSSI value measured only in the UL subframe may be corrected using a power difference of reference signals, and then, the RSRQ may be calculated using the corrected RSRP value and/or RSSI value.

2.1.3. Separate Measurement for UL/DL Resources

In order to know how much a specific UE is affected by UL/DL operations of an adjacent cell, an eNB may perform respective separate operations and report the operations to the UE according to cases in which the adjacent cell operates for UL and operates for DL. For example, with regard to measurement in a DL subframe, the eNB may divide a DL subframe into two sets and configure to correspond to each set to a DL subframe in which an adjacent cell performs DL transmission and UL transmission with high possibility. As described above, an eNB of each cell may transmit an index (or bitmaps of a plurality of subframes) of a DL subframe that the eNB needs to use for DL transmission or UL transmission or uses for DL transmission or UL transmission with very high possibility to an eNB of an adjacent cell. In this case, an eNB may compare a specific threshold with calculated possibility and notify an eNB of an adjacent cell of a subframe with possibility that is equal to or more than the specific threshold. In addition, the eNB may also transmit index (or bitmap) information of the subframe and information indicating use of resource at a corresponding location to the adjacent eNB.

Likewise, when the eNB configures two measurement sets for a DL subframe as a subframe in which an adjacent cell performs DL transmission with high possibility and a subframe in which the adjacent cell performs UL transmission with high possibility, the eNB can easily recognize influence of a transmission direction of the adjacent cell on the corresponding cell and can recognize a subframe in which transmission needs to be performed. Referring back to FIG. 8, the eNB separately notifies the UE of sets of a DL subframe in which the operation of FIG. 8(a) is performed and a DL subframe in which the operation of FIG. 8(b) is performed, and the UE may perform separate measurements on the respective sets and report measured values to the eNB. This operation can be applied to measurement in a UL subframe used for DL transmission.

The embodiments described in 2.1.1. to 2.1.3. above can be applied to both measurements in DL and UL resources or can be applied to only one of measurements in DL and UL resources. That is, any one of the aforementioned embodiments can be applied to both measurements in DL and UL resources or two embodiments of the aforementioned embodiments can be applied to measurements in DL and UL resources, respectively. As an example of a combination of embodiments, the eNB may command the UE to separately perform measurements in DL and UL resources, and the UE may perform measurement for DL resource only in resource that is configured as DL resource by an adjacent cell with high possibility according to the embodiment described in 2.1.1. above but perform measurement for UL resource only in a subframe indicated as a valid subframe according to reception of a subframe use indicator or a scheduling message according to the embodiment described in 2.1.2. above. In addition, the eNB may command the UE to separately perform measurements in DL and UL resources and divide a DL subframe into two sets according to a transmission direction of an adjacent cell, and the UE may separately perform measurement for DL resource in the respective set according to the embodiment described with reference to 2.1.3. above and perform measurement in UL resource only in a subframe indicated as a valid subframe according to reception of a subframe use indicator or a scheduling message according to the embodiment described in 2.1.2. above.

2.2. Measurement of RSSI Including Signal of Adjacent Cell

When an eNB may transmit separate information about an operational direction of an adjacent cell to a UE, the UE may measure a signal of an adjacent cell, and the eNB may recognize a transmission direction of the adjacent cell based on the measured value reported by the UE and separate cases in which an adjacent cell operates for UL and operates for DL. For example, as described above, in the case of RSRP, the UE may measure the RSRP in a DL subframe in which a serving eNB stably performs DL transmission and report the RSRP to an eNB, and in the case of RSSI, the UE may measure the RSSI for each respective subframe (a DL subframe or a DL subframe) and then report distribution information of the RSSI measured over a plurality of pre-configured subframes to the eNB. For example, in the case of RSSI, the UE may measure the RSSI for each respective subframe in a UL subframe used for DL transmission and report distribution information of the RSSI measured for a plurality of subframes to the eNB. The distribution information of the measured RSSI value may be reported together with the measured RSSI value pre-reported to the eNB by the UE as the measurement result or may be reported to the eNB instead of the measured RSSI value pre-reported to the eNB by the UE.

An example of the distribution information may include maximum and minimum of the RSSI. The UE may report the maximum and minimum of the RSSI monitored for a predetermined period of time to the eNB such that the eNB may recognize a communication state of the corresponding UE. For example, when the maximum and minimum of the RSSI is reported at similar levels through the RSSI distribution information, the corresponding UE can recognize that the corresponding UE is barely affected by a communication direction of an adjacent cell and can perform DL transmission on the corresponding UE in a UL frame irrespective of a transmission direction of the adjacent cell. On the other hand, when the maximum and minimum of the RSSI are much different, it can be derived that the great RSSI difference is caused from UL transmission of a UE of a cell adjacent to the corresponding UE, and preferably, the eNB performs DL transmission on the corresponding UE using resource in which the adjacent cell mainly performs DL transmission. That is, when the UE reports the distribution information of the RSSI to the eNB in a DL subframe used for DL transmission, the eNB may perform DL transmission on the corresponding UE in a DL subframe in which an adjacent cell mainly performs DL transmission, and when the UE reports the distribution information of the RSSI to the eNB in a UL subframe used for DL transmission, the eNB may perform DL transmission on the corresponding UE in a UL subframe in which the adjacent cell mainly performs DL transmission.

The distribution information of the RSSI may have the following forms in addition to the maximum and the minimum.

1) The UE may report information about a frequency at which RSSI that is equal to or more than (or exceeds) a predetermined threshold and/or is equal to or less than (or less than) the predetermined threshold is measured or information about a subframe in which the RSSI is measured to the eNB. The UE may report all the pieces of information about the frequency and subframe of the RSSI to the eNB. Here, the subframe information refers to information indicating a subframe measured by the aforementioned RSSI and for example, may include a subframe index. However, when it is not possible to specify the corresponding subframe using only the subframe index, the subframe information may include both a radio frame index and a subframe index. In addition, the threshold may be given by x % of an average RSSI value calculated in a time period of a plurality of subframes in which the UE measures RSSIs.

2) The UE may report an average value of measured RSSI values that are equal to or more than (or exceeds) a predetermined threshold and/or are equal to or less than (or less than) the predetermined threshold to the eNB. Like in 1) above, the threshold may be given by x % of an average RSSI value calculated in a plurality subframe time period in which the UE measures RSSIs. In addition, a time period for calculation of an average value of the measured RSSI value reported to the eNB may be the same as a time period of a plurality of subframes in which the UE measures the RSSI.

3) The UE may align RSSI values measured in a time period of a plurality of subframes for measurement of the RSSIs according to their sizes and then report measured RSSI values corresponding to predetermined specific top and/or low x % or an average of measured RSSI values corresponding to top and/or low x % to the eNB.

An operation in which the UE measures a signal of an adjacent cell and reports the measured signal to the eNB, that is, an operation in which the UE reports RSSI distribution information for a predetermined subframe period to the eNB can be applied to both measurements for DL and UL resources or can be applied to only one of DL and UL resources. In addition, a combination of the operation and the method described in 2.1. above can be used.

The aforementioned method of reporting the RSSI distribution information can be performed by directly reporting the RSSI distribution information to the eNB or by reporting RSRQ distribution information acquired via combination with a measured RSRP value to the eNB.

3. Overview of Apparatus to which the Present Invention is Applicable

Figure 9:
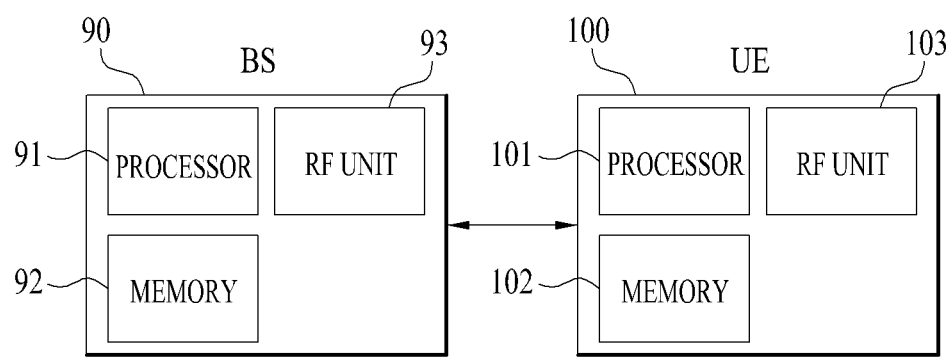
FIG. 9 is a block diagram of a wireless communication apparatus according to an embodiment of the present invention.

FIG. 9 is a block diagram of a wireless communication apparatus according to an embodiment of the present invention.

Referring to FIG. 9, a wireless communication system includes a BS 90 and a plurality of UEs 100 positioned within a region of the BS 90.

The BS 90 includes a processor 91, a memory 92, and a radio frequency (RF) unit 93. The processor 91 embodies the proposed functions, processes, and/or methods. Layers of a wireless interface protocol may be embodied by the processor 91. The memory 92 is connected to the processor 91 and stores various pieces of information for driving the processor 91. The RF unit 93 is connected to the processor 91 and transmits and/or receives a radio signal.

The UE 100 includes a processor 101, a memory 102, and an RF unit 103. The processor 101 embodies the proposed functions, processes, and/or methods. Layers of a wireless interface protocol may be embodied by the processor 101. The memory 102 is connected to the processor 101 and stores various pieces of information for driving the processor 101. The RF unit 103 is connected to the processor 101 and transmits and/or receives a radio signal.

The memories 92 and 102 may be disposed within or outside the processors 91 and 101 and may be connected to the processors 91 and 101 via various means. In addition, the BS 90 and/or the UE 100 may have a single antenna or multiple antennas.

The embodiments of the present invention described above are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by a subsequent amendment after the application is filed.

The embodiments of the present invention may be achieved by various means, for example, hardware, firmware, software, or a combination thereof. In a hardware configuration, the methods according to exemplary embodiments of the present invention may be achieved by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration, an embodiment of the present invention may be implemented in the form of a module, a procedure, a function, etc. Software code may be stored in a memory unit and executed by a processor. The memory unit is located at the interior or exterior of the processor and may transmit and receive data to and from the processor via various known means.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

INDUSTRIAL APPLICABILITY

The data transmission/reception method in a wireless access system according to the present invention has been described in terms of an example applied to a 3rd generation partnership project long term evolution (3GPP LTE) system but can be applied to various wireless access systems in addition to the 3GPP LTE system.

The invention claimed is:

1. A method for supporting a downlink (DL) transmission measurement and an uplink (UL) transmission measurement of a user equipment (UE) in a wireless access system for supporting an environment in which amounts of UL subframes and DL subframes are dynamically changed, the method performed by a base station (BS) and comprising:
   transmitting configuration information for allocating the UL subframes and the DL subframes to the UE;
   transmitting, to the UE, first information related to a first reference signal for the DL transmission measurement on a first subframe,
   wherein the first subframe is a DL subframe allocated according to the configuration information;
   transmitting, to the UE, second information related to a second reference signal for UL transmission measurements for a second subframe,
   wherein the second subframe is a UL subframe allocated according to the configuration information;
   transmitting a difference value between a first transmission power and a second transmission power to the UE, wherein the first transmission power is a transmission power for the first reference signal and the second transmission power is a transmission power for the second reference signal; and
   receiving a RSRQ (reference signal received quality) value for the UL subframe from the UE,
   wherein the DL transmission measurement is performed using only an RSRP (reference signal received power) measurement, and the UL transmission measurements is performed using only an RSSI (received signal strength indicator) measurement, and
   wherein the RSRQ value for the UL subframe is calculated based on the RSRP measurement for the DL transmission measurement, the RSSI measurement for the UL transmission measurements and the difference value.

2. A method of performing a downlink (DL) transmission measurement and an uplink (UL) transmission measurement in a wireless access system for supporting an environment in which amounts of UL subframes and DL subframes are dynamically changed, the method performed by a mobile station and comprising:

receiving, from a base station (BS), configuration information for allocating the UL subframes and the DL subframes;

receiving, from a base station (BS), first information related to a first reference signal for the DL transmission measurement on a first subframe, wherein the first subframe is a DL subframe allocated according to the configuration information;

receiving, from the BS, second information related to a second reference signal for the UL transmission measurements for a second subframe, wherein the second subframe is a UL subframe allocated according to the configuration information;

receiving, from the BS, a difference value between a first transmission power and a second transmission power to the UE, wherein the first transmission power is a transmission power for the first reference signal and the second transmission power is a transmission power for the second reference signal;

performing the DL transmission measurement on the first subframe based on the first information and the UL transmission measurement on the second subframe based on the second information, wherein the DL transmission measurement is performed using only an RSRP (reference signal received power) measurement, and the UL transmission measurements is performed using only an RSSI (received signal strength indicator) measurement;

calculating a RSRQ (reference signal received quality) value for the UL subframe based on the RSRP measurement for the DL transmission measurement and the RSSI (received signal strength indicator) measurement for the UL transmission measurements and the difference value; and transmitting, to the BS, the RSRQ value.

3. A base station for supporting a downlink (DL) transmission measurement and an uplink (UL) transmission measurement of a user equipment (UE) in a wireless access system for supporting an environment in which amounts of UL subframes and DL subframes are dynamically changed, the base station (BS) comprising:

a transceiver configured to transmit and receive a radio signal; and a processor configured to:

control the transceiver to transmit configuration information for allocating the UL subframes and the DL subframes to the UE, control the transceiver to transmit, to the UE, a first information related to a first reference signal for the DL transmission measurement on a first subframe, wherein the first subframe is a DL subframe allocated according to the configuration information, control the transceiver to transmit, to the UE, second information related to a second reference signal for UL transmission measurements for a second subframe, wherein the second subframe is a UL subframe allocated according to the configuration information, control the transceiver to transmit a difference value between a first transmission power and a second transmission power to the UE, wherein the first transmission power is a transmission power for the first reference signal and the second transmission power is a transmission power for the second reference signal, and control the transceiver to receive a RSRQ (reference signal received quality) value for the UL subframe from the UE, wherein the DL transmission measurement is performed using only an RSRP (reference signal received power) measurement, and the UL transmission measurements is performed using only an RSSI (received signal strength indicator) measurement, and wherein the RSRQ value for the UL subframe is calculated based on the RSRP measurement for the DL transmission measurement, the RSSI measurement for the UL transmission measurements and the difference value.

4. A user equipment (UE) for performing a downlink (DL) transmission measurement and an uplink (UL) transmission measurement in a wireless access system for supporting an environment in which amounts of UL subframes and DL subframes are dynamically changed, the UE comprising:

a transceiver configured to transmit and receive a radio signal; and a processor configured to:

control the transceiver to receive, from a base station (BS), configuration information for allocating the UL subframes and the DL subframes, control the transceiver to receive, from the BS, a first information related to a first reference signal for the DL transmission measurement on a first subframe, wherein the first subframe is a DL subframe allocated according to the configuration information, control the transceiver to receive, from the BS, second information related to a second reference signal for UL transmission measurements for a second subframe, wherein the second subframe is a UL subframe allocated according to the configuration information, control the transceiver to receive, from the BS, a difference value between a first transmission power and a second transmission power to the UE, wherein the first transmission power is a transmission power for the first reference signal and the second transmission power is a transmission power for the second reference signal, perform the DL transmission measurement on the first subframe based on the first information and the UL transmission measurement on the second subframe based on the second information, wherein the DL transmission measurement is performed using only an RSRP (reference signal received power) measurement, and the UL transmission measurements is performed using only an RSSI (received signal strength indicator) measurement, calculate a RSRQ (reference signal received quality) value for the UL subframe based on the RSRP measurement for the DL transmission measurement and the RSSI measurement for the UL transmission measurements and the difference value, and control the transceiver to transmit, to the BS, the RSRQ measurement value.

* * * * *